United States Patent
Kirkman

(10) Patent No.: US 7,950,442 B2
(45) Date of Patent: May 31, 2011

(54) DIE CASTING DESIGN METHOD AND SOFTWARE

(75) Inventor: J. Scott Kirkman, Ada, MI (US)

(73) Assignee: Die Therm Engineering LLC, Ada, MI (US)

( * ) Notice: Subject to any disclaimer, the term of this patent is extended or adjusted under 35 U.S.C. 154(b) by 530 days.

(21) Appl. No.: 12/138,703

(22) Filed: Jun. 13, 2008

(65) Prior Publication Data

US 2008/0308248 A1    Dec. 18, 2008

Related U.S. Application Data

(60) Provisional application No. 60/944,307, filed on Jun. 15, 2007, provisional application No. 60/952,994, filed on Jul. 31, 2007.

(51) Int. Cl.
  *B22D 17/08* (2006.01)
  *B22C 9/00* (2006.01)
  *G06F 17/50* (2006.01)
(52) U.S. Cl. ......... 164/125; 164/122; 164/348; 700/200
(58) Field of Classification Search .................. 164/122, 164/125–128, 348, 458; 700/200
  See application file for complete search history.

(56) References Cited

U.S. PATENT DOCUMENTS

| | | | |
|---|---|---|---|
| 4,031,950 A | 6/1977 | Shultz | |
| 4,976,305 A | 12/1990 | Tanaka et al. | |
| 5,589,114 A | 12/1996 | Evans | |
| 5,881,796 A | 3/1999 | Brown et al. | |
| 5,887,640 A | 3/1999 | Brown et al. | |
| 5,927,378 A | 7/1999 | Grove et al. | |
| 6,192,327 B1 * | 2/2001 | Nishiyama et al. | ............... 703/2 |
| 6,224,816 B1 | 5/2001 | Hull et al. | |
| 6,308,768 B1 | 10/2001 | Rice et al. | |
| 6,312,628 B1 | 11/2001 | Wieder et al. | |
| 6,354,361 B1 | 3/2002 | Sachs et al. | |
| 6,557,617 B1 | 5/2003 | Bagnoud et al. | |
| 6,598,659 B1 | 7/2003 | Frulla | |
| 6,698,496 B2 | 3/2004 | Takayama et al. | |
| 2002/0069997 A1 | 6/2002 | Mendez et al. | |
| 2006/0042771 A1 | 3/2006 | Ward | |
| 2006/0082009 A1 | 4/2006 | Quail et al. | |
| 2006/0196957 A1 | 9/2006 | Johnson | |

FOREIGN PATENT DOCUMENTS

| | | |
|---|---|---|
| EP | 0691166 A1 | 1/1996 |
| JP | 59141347 A | 8/1984 |
| JP | 01313146 A | 12/1989 |
| WO | 9706907 | 2/1997 |

OTHER PUBLICATIONS

Scott Kirkman, Die Casting Dies: Thermal Design & Control, book, 2005, pp. 1-54, vol. 3 of 6, North American Die Casting Association, Wheeling, Illinois.

J. Scott Kirkman, Designing Die Casting Dies Series—E-506, Book 1—2005, North American Die Casting Association, Wheeling, Illinois.

* cited by examiner

*Primary Examiner* — Kuang Y Lin
*Assistant Examiner* — Kevin E Yoon
(74) *Attorney, Agent, or Firm* — McGarry Bair PC

(57) ABSTRACT

A method for designing the location, surface temperature, flow rate, length and type of cooling lines within a mold for a casting process. The method allows the user to optimize each value for each individual cooling line of the mold. The method can utilize one or more parameters of the casting process and the heat load to be carried by each of the cooling lines in designing the mold.

21 Claims, 14 Drawing Sheets

Alloy Information

- Alloy Name:
- Alloy Density:
- Liquidus Temperature:
- Cooling Range:
- Specific Heat:
- Latent Heat:

- Spray Heat Removal Rate:
- Die Material Cooling Constant:

Alloy Density in lbs/in^3
Liquidus Temerature in Degrees F
Cool Range in Degrees F
Spray Heat Removal Rate in btu/in^2/sec
Die Material Cool Constant in btu/in/Degrees F

Die Cast Alloy Thermal Data

| Alloy | Specific Heat | Latent Heat | Solid Density | Liquidus Temp | Cooling Range |
|---|---|---|---|---|---|
| Aluminum 360, 380, 384 | 0.025 | 17.0 | 0.098 | 1100 | 100 |
| Aluminum 390 | 0.025 | 17.0 | 0.098 | 1225 | 160 |
| Magnesium | 0.022 | 10.2 | 0.067 | See Magnesium Table | |
| Zinc 3, 5, 7 | 0.024 | 10.6 | 0.245 | 728 | 10 |

Magnesium Table

| Alloy | Liquidus Temp | Cooling Range |
|---|---|---|
| AZ91D | 1105 | 230 |
| AZ81 | 1130 | 215 |
| AM60B | 1140 | 135 |
| A50A | 1150 | 140 |
| AM20 | 1190 | 45 |
| AE42 | 1150 | 100 |
| AS41B | 1150 | 100 |

K Value Table

| Die Material | K Value |
|---|---|
| H-13 | 1.25 |
| Mar-Aged | 1.3 |
| P-20 | 2.05 |
| Tungston | 3.83 |
| Anviloy | 5.9 |
| TZM | 6 |

Fig. 3

DIE CASTING DESIGN METHOD AND SOFTWARE

CROSS-REFERENCE TO RELATED APPLICATION

This application claims the benefit of U.S. Provisional Application Nos. 60/944,307, filed Jun. 15, 2007, and 60/952,994, filed Jul. 31, 2007, both of which are incorporated herein by reference in their entirety.

BACKGROUND OF THE INVENTION

1. Field of the Invention

The present invention relates generally to die casting. More specifically, the invention relates to the design of die casting systems.

2. Description of the Related Art

Casting is a manufacturing process by which liquid material is introduced into a mold, which contains a hollow cavity of a desired shape and then allowed to solidify. Die casting is the injection of molten metal under high pressure into a steel mold, interchangeably referred to as a die, for the purposes of rapid manufacturing at rapid production rates. The molten metal is most often a non-ferrous alloy, which is used because the best performance for die-cast products is gained through a blend of materials. Some typical alloys that are used for die casting are aluminum alloys, magnesium alloys and zinc alloys, which can contain other elements such as silicone.

Two methods can be used to inject molten metal into a die; cold chamber and hot chamber. A schematic illustration of a typical cold chamber die casting machine 600 is shown in FIG. 1A. The die casting machine 600 comprises a mold 602 made of tool steel in at least two die halves 604, 606 that together define a part cavity 608. The cover half 604 is held by a fixed machine platen 605, and the ejector half 606 is held by a moving machine platen 607 so that the ejector half 606 can move back and forth to open and close the mold 602. Molds 602 often also have moveable slides, cores, or other sections to produce holes, threads, and other desired shapes in the casting. Molds 602 are alternately referred to as dies or tools.

The die casting machine 600 further includes a pressure chamber 610 through which molten metal from a supply 612 is delivered or injected into the mold 602 using a plunger 614. One or more shot sleeves 616 in the cover half 604 allow molten metal to enter the die and fill the part cavity 608. When the pressure chamber 610 is filled with molten metal, the plunger 614 starts traveling forward and builds up pressure, thereby forcing the metal to flow though the shot sleeve 616 to the part cavity 608. After the metal has solidified, the plunger 614 returns to its initial position, and the ejector half 606 of the die opens for the part or casting to be removed from the mold 602. Ejector pins 617 are used to push the casting out of the ejector half 606 of the mold 602. This process is referred to as a single casting cycle. Multiple casting cycles can be completed during a die casting operation.

A schematic illustration of a typical cold chamber die casting mold 602 is shown in FIG. 1B. The die casting mold 602 comprises a biscuit 618, which is the remaining material in the shot sleeve 616 after the shot is complete. One or more runners 620 connect the shot sleeve 616 to corresponding gates 622 through which molten metal enters the part cavity 608. One or more overflows 624 are connected to the part cavity 608 to receive the first molten metal that enters the part cavity 608 because it is usually contaminated with petroliates from the die spray applied to the mold 602 in previous casting operations.

Cooling lines 626 run throughout the mold 602, through which coolant, such as water or oil, flows to aid in the removal of heat from the mold 602. There are a number of individual cooling lines 626 that are responsible for cooling different parts of the casting or shot. The number of cooling lines 626 in a mold varies according to the size of the mold. For example, a small mold may have fifteen cooling lines, while a large mold may have over a hundred cooling lines. The cooling lines 626 are all in communication with a coolant flow system (not shown), from which coolant is delivered to the cooling lines, and to which coolant returns after it flow through the cooling lines. Many coolant flow systems for dies are part of a plant-wide water system. Other coolant flow systems are "closed-loop" systems, in which coolant is only cycled through the coolant flow system.

The casting can be divided into multiple heat flow zones that are cooled by one or more cooling lines 626. The heat flow zones are generally indicated by the dotted boxes on FIG. 1B. The heat flow zones of the casting comprise the biscuit (Zone 0), the main runner (Zone I), the gate runner (Zone II), the gate side of the casting, also referred to as the gate side of the part (Zone III), the overflow side of the casting, also known as the gate side of the part (Zone IV), and the overflow (Zone V). The biscuit (Zone 0) generally corresponds to the biscuit 618. The main runner (Zone I) corresponds to the portion of the runners 620 that are closest to the biscuit 618. The gate runner (Zone II) corresponds to the portion of the runners 620 that is closest to the part cavity 608. The gate side of the casting (Zone III) is the casting half nearest to the gates 622. The overflow side of the casting (Zone IV) is the casting half furthest away from the gates 622. The overflow (Zone V) generally corresponds to the overflows 624.

There are primarily three critical die-casting process control requirements. The first requirement relates to the timing and function of the die casting machine. The timing of the opening and closing of the mold must be closely managed during the process to sequence operations such as injecting metal into the part, dealing with moving slides, making any intricate details in the casting, and extracting the part. The timing of these and other operations can be controlled to optimize the production rate and quality of the castings.

The second requirement relates to the injection processes at the shot end of the die casting machine. The injection processes, both from the standpoint of hardware and software, have been developed over time to optimize the control of injecting the liquid metal into the mold. Injection speed, injection pressure, and flow rate are all involved in the control of the injection process and can be taken into account during the design of the die casting process. Technologies have been developed to address the first two requirements in terms of machine design and shot end design to manage the first two problems that die casters have dealt with.

The third requirement relates to the thermal design, monitoring and control of the die casting process, including temperature detection and the removal of heat from the mold. Thermal design encompasses designing the cooling system of a die casting machine, which includes determining the number of cooling lines, the placement of each cooling line relative to the part cavity, the depth of each cooling line relative to the die surface, using the appropriate size, i.e. diameter, of cooling line, and determining the appropriate flow rate of each cooling line. Misplacement of cooling lines in a die casting mold results in a mold that does not cool properly, which can lead to subpar casting performance and poor quality castings. Thermal monitoring refers to monitoring temperature and heat during the actual use of the die. Thermal control encompasses taking the information gathered from thermal monitoring and responding to that information, with respect to the intended thermal design.

Thermal design has historically been haphazard in the engineering of die casting processes. This is partly because the mathematics involved in thermally designing a die can be complex. The typical standard for thermal design in the die casting industry is based upon experimental knowledge of the die casting process. Often a designer works with a toolmaker to roughly estimate the appropriate location of cooling lines. A computerized thermal simulation can then be used to evaluate a potential design. The results of the simulation are reviewed, and the design is modified based on the results. An iterative process of estimating the position of cooling lines, running a computerized thermal simulation, reviewing the results and then modifying the position of the cooling lines based upon the results is required to achieve a suitable die design. After multiple iterations, a fairly good design can be achieved, but it might not be the optimum process for all die casting systems. Also, designing a die casting system using the iterative process is slow because of the potentially high number of iterations that must be completed until a suitable design is found.

Another problem is that most simulation software was founded in gravity casting techniques. Gravity casting uses sand molds that operate like insulators, so little heat is lost during a casting operation. In die casting, as the liquid metal enters into the mold, a significant amount of heat is lost during filling, which is not taken into account by the simulation software.

The use of plant-wide water systems as a source of coolant also effects the thermal aspects of a die casting process. Such water systems have significant variation in temperature of the water, which is difficult to account for during thermal design of a die casting machine and is difficult to control during operation. There are also chemistry concerns when using a plant-wide water system, because contaminants such as calcium and lime in the water can cause a film to develop on the cooling lines, which restricts heat transfer between the mold and the coolant.

Die life is a function of thermal fatigue in the mold. Thermal fatigue is brought on by the temperature variation that the mold steel must withstand during production. The level of thermal fatigue is driven by the accuracy of the location of cooling lines because if there is inaccuracy in position of the cooling line, the surface temperature of the mold can be an undesirable level. For example, when using an aluminum alloy for casting, the die surface temperature at injection is typically near 600° F. If the cooling line is placed too far away from the die surface, the die surface temperature may be allowed to rise to as high as 800° F. Since the coolant is not removing the appropriate amount of heat, an external spray must be used. External sprays, which contain petroliate, are normally only used during die release to allow the casted part to be more easily extracted from the mold, but because of the high die surface temperature caused by misplacement of the cooling lines, the external spray, which may be further diluted with water, is used to cool the die during the casting process.

In such cases where the die surface temperature is unusually high and the external temperature of the die is low from the use of an external spray, a phenomenon called "heat checking" occurs, which is the effect of exceeding the fatigue limit of the material the mold is made from. All molds have minute cracks in the mold surface, and liquid metal enters these cracks during a casting operation. Heat checking thermally insulates the die and reduces the potential heat removal from the die. Eventually the mold can crack, and pieces of the mold may stick to the part, which can cause a number of problems such as poor part quality or part failure.

Another problem with current die casting thermal design is that little emphasis has been given to the location of shrinkage porosity defects in the product and to controlling the dimensional accuracy and precision in relation to gas porosity defects. When the casting material goes from liquid to solid, its density increases, which causes a volumetric void to form near the last area to solidify within the casting. Improper thermal design of the mold can cause a volumetric void to form in an undesired location in the casting, potentially forming a defect in the final product.

With regard to dimensional accuracy and precision in relation to gas porosity defects, the die casting process has long been considered a net shape process, but not an accurate one. The reason behind the poor dimensional accuracy and precision is that since the injection temperature of the liquid metal varies in different sections of the casting, the casting is often ejected at an inconsistent temperature. The shrinkage that the casting undergoes will be inconsistent as well since the entire casting has to cool down to ambient temperature. For example, if one section of the casting is at a temperature of 800° F. at ejection, and another section of the casting is at 300° F. at ejection, the section at 800° F. will undergo more shrinkage than the section at 300° F. This inconsistent shrinkage can create distortion and dimensional inaccuracy in the casting, potentially necessitating additional machining operations on the casting to achieve reasonable dimensional control.

Another problem associated with poor thermal design occurs during the process of ejecting the casting from the mold. If there is a "hot spot" in the die, i.e. a portion of the die that retains more heat than the rest of the die, ejection is delayed because that area of the casting must cool longer than the rest of the casting, which means that the remainder of the casting will be cooler than it needs to be for ejection. When the casting cools too long within the mold, it can contract around details in the die and may increase the force needed to eject the casting, which can cause distortion or cracking of the casting. Waiting for the hot spot to cool also results in longer cycle times. Hot spots may also cause soldering to occur, which is when the temperature of a portion of the die is so high that the die spray burns off and the casting sticks inside the part cavity. The casting may still be ejected, but some of the casting material may stick to the die and oxidize.

SUMMARY OF THE INVENTION

The present invention focuses on the thermal aspects of a casting process. In accordance with one aspect of the present invention, a method is provided for designing the location, surface temperature, flow rate, length and type of at least one cooling line within a mold. The method comprises the steps of providing at least one of a cooling line depth and a cooling line surface temperature for the at least one cooling line, determining the other of the at least one of a cooling line depth and a cooling line surface temperature for the at least one cooling line, providing at least one of a cooling flow rate and a cooling line length for the at least one cooling line, determining the other of the at least one of a cooling flow rate and a cooling line length for the at least one cooling line for a selection of cooling line types, and selecting a cooling line type for the at least one cooling line from the selection of cooling line types.

BRIEF DESCRIPTION OF THE DRAWINGS

A complete understanding of the present invention may be obtained by reference to the accompanying drawings, when considered in conjunction with the subsequent, detailed description, in which:

FIGS. 3-12 illustrate a first embodiment of an exemplary software program that can be used to carry out the design method 10 shown in the flowchart of FIGS. 2A and 2B.

For purposes of clarity and brevity, like elements and components will bear the same designations and numbering throughout the Figures.

DESCRIPTION OF THE PREFERRED EMBODIMENTS

The present invention sets forth a method for designing thermal aspects of a die. Particularly, the design method can be used to develop a cooling system for a die. The design method can be used to accurately locate cooling lines within a die to assure that the die surface temperature, the casting quality, the cycle time and the die life are all optimized. A software program for carrying out the method is also presented. While the design method of the invention is described herein as having particular application to die casting operations, the design method can also be generally applied to permanent mold casting, injection molding, plastic molding, and other forming operations.

The design method includes receiving a set of information about the die to be designed, following the steps of the design method to determine the number of cooling lines, the placement of each cooling line relative to the part cavity, the depth of each cooling line relative to the die surface, the appropriate surface temperature of each cooling line, the appropriate length of each cooling line, the appropriate cooling line type, including the size, i.e. diameter, of each cooling line, and the appropriate coolant flow rate of each cooling line. Then, the output information from the design method can be used to build a die. Some testing may need to be done after the die is built; however, one intent of the design method is to minimize the amount of die development time. The design method can assure that the die surface temperature is maintained properly. It is also possible to improve die life through the design method.

I. Thermal Design Method

One of the unique features of the design method and accompanying software program is that it allows for a direct calculation of the cooling line type, size and depth using a linear flow of equations. The reason this new calculation process is linear is that the cooling line length $L_{CL}$ and the coolant temperature are predetermined. The cooling line length can be selected by a user as one part of a series of calculations leading up to the calculation of the cooling line type, size and depth. The coolant temperature can be predetermined through the use of a closed-loop coolant system in which the temperature of the coolant is maintained at a desired value by a chiller.

Figure 2A:
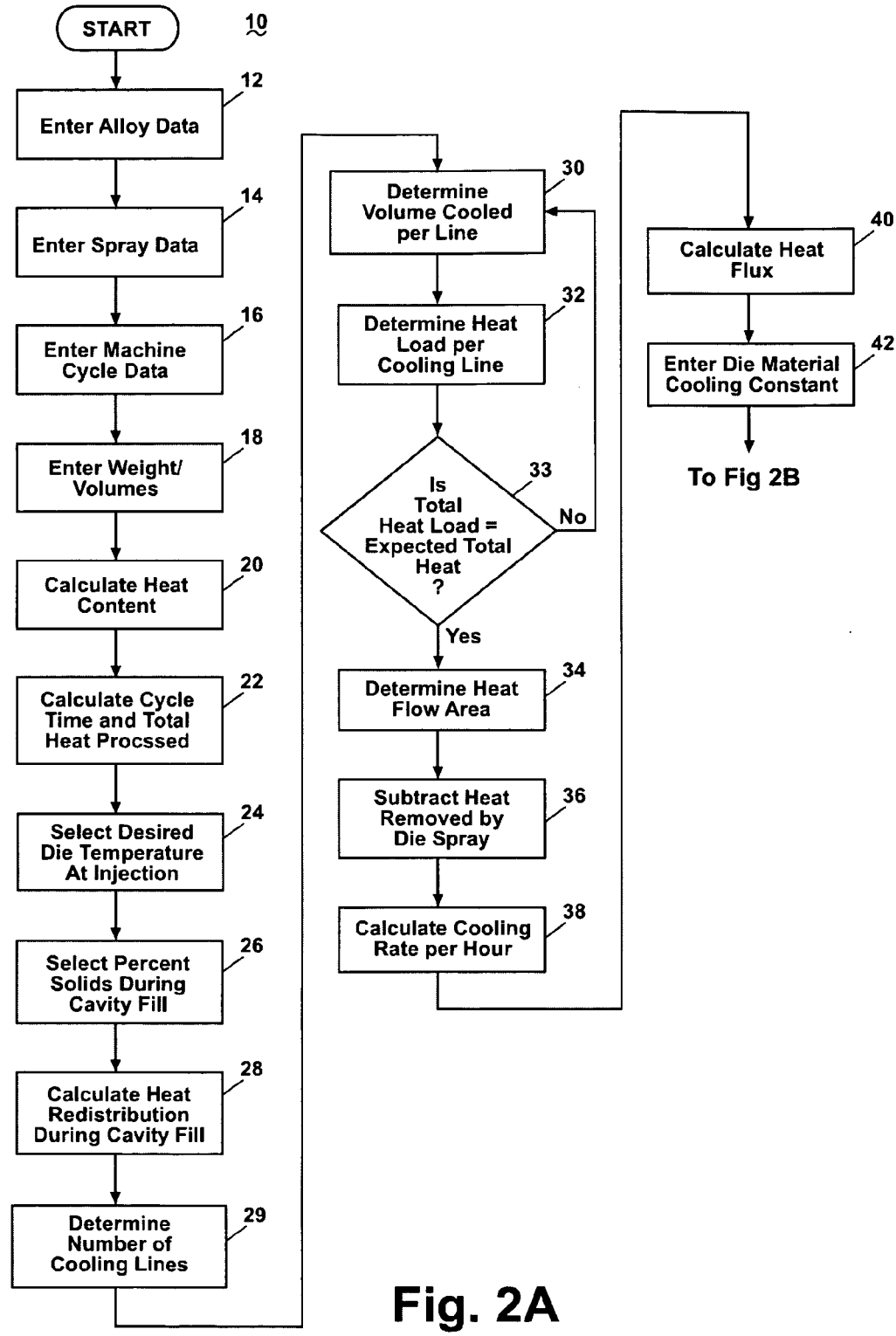
FIGS. 2A and 2B illustrate a flowchart detailing the steps an exemplary design method 10 according to the invention.
Figure 2B:
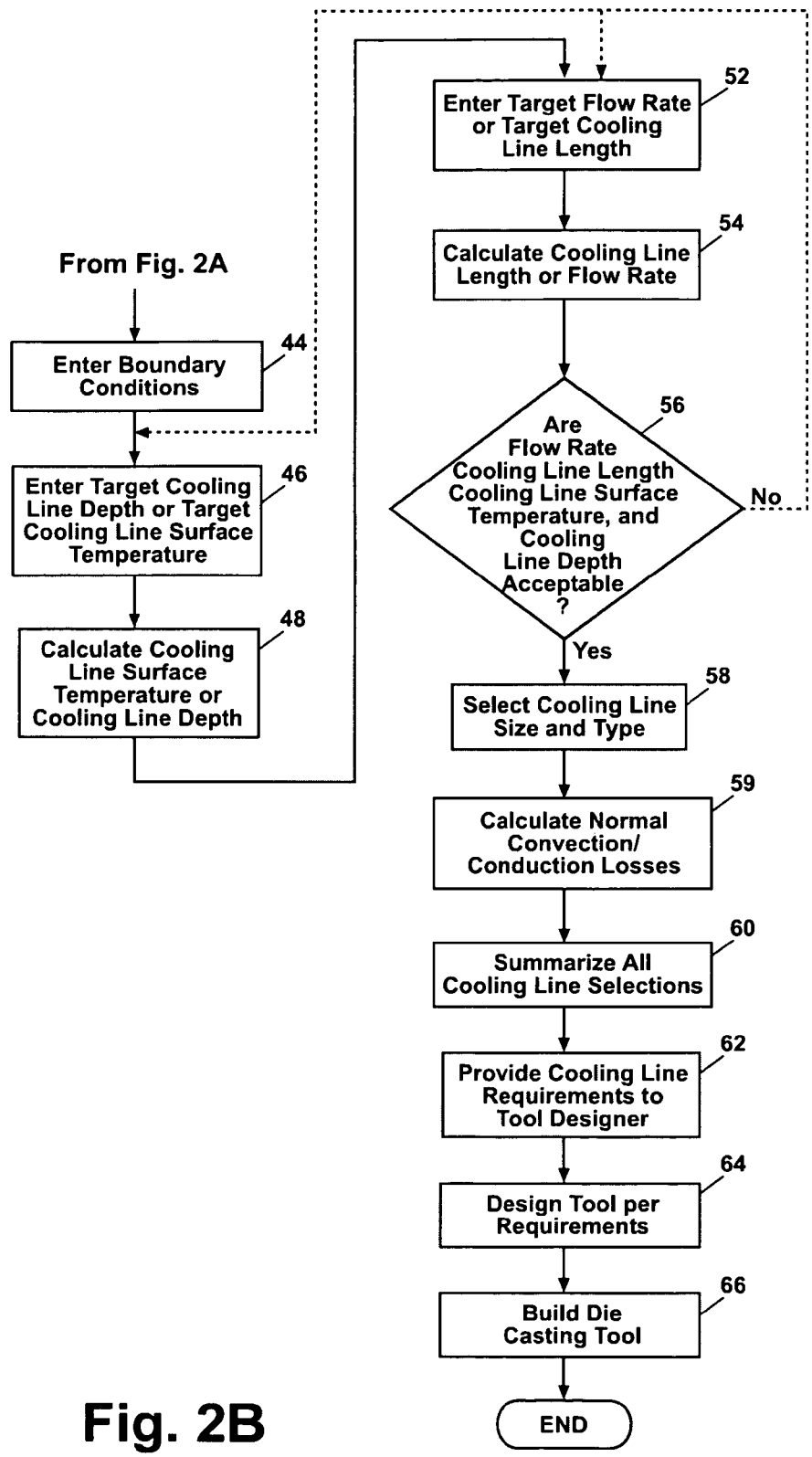

A flowchart detailing the steps of an exemplary design method 10 that can be used to determine the placement of cooling lines within a die according to the invention in presented in FIGS. 2A and 2B. Steps 12-42 of the design method 10 are shown in FIG. 2A, while steps 44-66 of the design method are shown in FIG. 2B. The exemplary design method 10 is provided for illustrative purposes only and is not intended to limit the invention in any manner. It is understood that reasonable variation and modification of the sequence of the foregoing steps of the design method 10 are possible without departing from the scope of the invention.

Prior to the initiation of the design method 10, a set of data pertaining to the die for which a cooling system is to be designed is needed. The data may contain information such as the size of the die, the dimension of the casting to be made, the number of mold inserts, how the mold inserts are segregated, the number and type of slides and other moving pieces, and the quality requirements of the casting, such as surface finish and porosity.

The design method 10 begins with a step 12 of entering alloy data. Information that may be entered in step 12 includes the name, density D, liquidus temperature $T_{LIQ}$, cooling range $R_C$, specific heat C, and latent heat L of the alloy that is going to be used to make the part. The cooling range is the difference between the liquid temperature and the solidus temperature of the alloy.

In step 14, the spray data is entered. Information that may be entered in step 14 includes the spray heat removal rate $Q_S$, which is equivalent to the amount of heat removed by the die spray or die release agent per area, per the amount of time the die spray is applied.

In step 16, machine cycle data is entered. Machine cycle data includes the minimum amount of time required to complete each step or element of a die casting operation and can be used to calculate the time for a die casting operation to be completed. The machine cycle data is used to calculate the dry shot cycle rate DSCR, which by definition is the fastest that a die casting machine can be operated without consideration of the thermal aspects of a die casting process. Information that may be entered in step 16 includes ladle time, ladle delay time, shot time, die open time, core open time, injection time, extraction time, spray remove time, blow off time, core close time, and die close time. The dry shot cycle rate DSCR is calculated using the equation $$DSCR = \sum_{i=1}^{n} T_{min(i)} \qquad (1)$$

where n is the number of steps or elements of the die casting operation, i indicates the step or element, and $T_{min(i)}$ is the minimum amount of time need to complete step or element i.

Machine cycle data entered in step 16 further includes the dwell time constant $\tau_d$ and the spray time constant $\tau_s$. The dwell time constant is the dwell time of the casting in terms of the thickness of the casting, and the spray time constant is the spray time of the casting in terms of the thickness of the casting. The dwell time is the amount of time the casting material resides in the mold, i.e. from when the casting material is injected to when the mold opens. The spray time is the amount of time that the casting is sprayed after the mold opens. Both constants are estimated by the user based on the user's training and experience, and can be refined over time.

In step 18, the weight W or volume V of each heat flow zone of the casting are entered. As discussed with reference to FIG.

1B, the heat flow zones of the casting comprise the biscuit, the main runner, the gate runner, the gate side of the casting, the overflow side of the casting, and the overflows. If a hot chamber process is used, a sprue replaces the biscuit. Only one of the weight and the volume of each component needs to be entered in step 18. The other of the weight and the volume can be calculated using the equation $$V = \frac{W}{D} \quad (2)$$

where the density D of the alloy was entered in step 12.

Figure 1A:
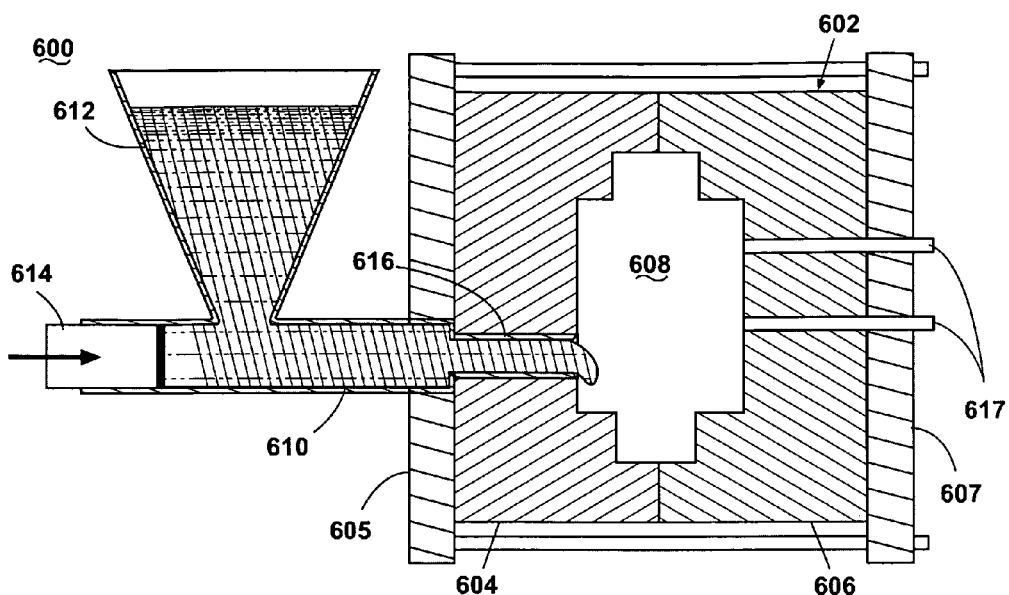
FIG. 1A is a schematic illustration of a typical cold chamber die casting machine.
Figure 1B:
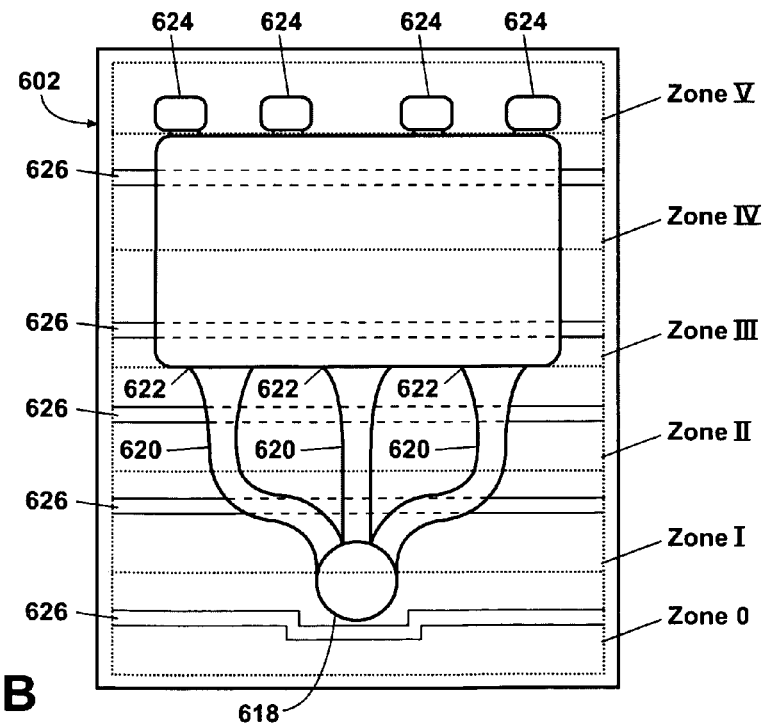
FIG. 1B is a schematic illustration of a typical cold chamber die casting die or mold.

The goal of step 18 is to determine weight for each of the heat flow zones, accomplished either through user entry or through use of Equation (2) and the total shot weight $W_T$ and total shot volume $V_T$ which are calculation using the equations $$W_T = \sum_{i=1}^{n} W_i \quad (3)$$

$$V_T = \sum_{i=1}^{n} V_i \quad (4)$$

where n is the number of heat flow zones, i indicates the heat flow zone, $W_i$ is the weight of the heat flow zone i, and $V_i$ is the volume of the heat flow zone i. In accordance with FIG. 1B, there are six heat flow zones, i.e. n=6; therefore, the weight of the six heat flow zones is summed to determine the total shot weight $W_T$ and the volume of the six heat flow zones is summed to determine the total shot volume $V_T$.

In step 20, the injection temperature $T_I$ and the ejection temperature $T_E$ of the casting material is selected and the heat content $\Delta H$ of the casting material is calculated based on the alloy and the selected injection/ejection temperatures. The heat content is an indication of the total amount of heat that must be removed from the casting per cubic inch of material, and, based upon the volume, the total amount of heat that must be processed by the die per shot and is calculated using the equation $$\Delta H = (T_I - T_E) \times C + L \quad (5)$$

where the specific heat C, and latent heat L of the alloy where entered in step 12.

In step 22, the cycle time $T_C$ is calculated, along with the total amount of heat processed by the die per hour $Q_T$ based on the cycle time. The cycle time is calculated from the dry shot cycle rate DSCR calculated in step 16, the dwell time $T_D$ and the spray time $T_S$ using the equations $$T_D = K_C \times \tau_d \quad (6)$$

$$T_S = K_C \times \tau_s \quad (7)$$

$$T_C = \text{DSCR} + T_D + T_S \quad (8)$$

where the thickness $K_C$ of the casting is determined prior to the initiation of the design method 10, and the dwell time constant $\tau_d$ and the spray time constant $\tau_s$ were entered in step 16.

The total heat per shot $Q_{TS}$ can be calculated using the equation $$Q_{TS} = V_T \times \Delta H \quad (9)$$

and is based on the total shot volume $V_T$ determined according to step 18 and the heat content $\Delta H$ determined according to step 20.

Then, the total amount of heat processed by the die per hour $Q_T$ is calculated using the total heat per shot $Q_{TS}$ and the cycle time $T_C$ using the equation $$Q_T = \frac{Q_{TS}}{T_C} \quad (10)$$

In step 24, a target die surface temperature at injection $T_{DIE}$ is selected for each cooling line. The target die surface temperature is selected based on the desired surface finish of the casting and the desired cycle time. Surface finish and cycle time are inversely related, i.e. a better surface finish requires a longer cycle time, and setting the target die surface temperature can be done so as to optimize each value in relation to the other. Setting the die temperature at injection to a target value allows for minimizing the amount of heat to be removed by the heat flow zones so that the casting is ejected at the highest possible temperature so that less heat is transferred to the mold, resulting in more heat staying with the casting.

In step 26, the percentage of solids % S present in the molten metal during cavity fill is selected. The percentage of solids (also referred to herein as percent solids) can be chosen by the user based on the level of product quality desired for the casting. For example, if a casting requires a high surface finish, a low percent solids is entered. The user can consult a reference material, such as tables provided by the North American Die Casting Association, to determine a suitable percent solids.

Alternately, the user can choose to use a value for the percentage of solids % S calculated based on the casting alloy. The percentage of solids % S is based on the fill time $T_f$, which is the desired amount of time to fill the casting cavity, the minimum flow temperature $T_{MIN}$, which is the lowest temperature at which the alloy can easily flow into the cavity, both of which are selected by the user, the heat transfer rate r, which is a constant approximately equal to 0.866, and the latent heat ratio per percent solidification Z, which can be calculated using equation $$Z = \frac{L}{C} \times 100\% \quad (36)$$

Then, the percentage of solids % S is calculated using equation $$\% S = \frac{\left(\frac{T_f \times K_C}{r}\right) \times (T_{MIN} - T_{DIE}) - (T_I - T_{MIN})}{Z} \quad (37)$$

where the thickness $K_C$ of the casting is determined prior to the initiation of the design method 10, the injection temperature $T_I$ was selected in step 20, and the target die surface temperature at injection $T_{DIE}$ was entered in step 24.

In step 28, the redistribution of heat during cavity fill with respect to each heat flow zone is determined using a series of calculations. The redistribution of heat during cavity fill is essentially the total heat processed by each heat flow zone. The percent solids present in the molten metal has a direct bearing on heat redistribution since the molten metal that initially enters the part cavity will fill the overflows first, and the metal filling the overflows will remove heat from the mold. Therefore, it is important to take into account the heat loss to overflow metal $Q_{LOSS}$, which can be calculated using the equation $$Q_{LOSS} = L \times (1 - \% S) + C \times (T_I - T_{LIQ} + \% S \times R_C) \quad (11)$$

where the latent heat L, specific heat C, liquidus temperature $T_{LIQ}$, and cooling range $R_C$ of the alloy were entered in step 12, the injection temperature $T_I$ was selected in step 20, and the percent solids % S was selected in step 26.

Each heat flow zone is responsible to cool a portion of the shot, so it is necessary to determine how much of the shot in terms of volume each heat flow zone will cool so that the die can be designed properly. First, the original heat $Q_Z$ for each heat flow zone is determined, which is the heat content of each heat flow zone in terms of volume. The original heat for each heat flow zone can be calculated using equation $$Q_Z = V \times \Delta H \quad (12)$$

where the volume V of each heat flow zone was entered or determined in step 18 and the heat content $\Delta H$ of the casting material was determined in step 20.

Next, a percentage of the overflow heat loss % $Q_{LOSS}$ attributable to each heat flow zone is determined. During a casting cycle, the molten metal that initially enters the part cavity will fill the overflow (Zone V) first, the overflow side of the casting (Zone IV) second, the gate side of the casting (Zone III) third, the gate runner (Zone II) fourth, the main runner (Zone I) fifth, and the biscuit (Zone 0) last. As the molten metal travels through the heat flow zones, heat from the molten metal will be "dropped off", i.e. transferred or lost to the mold, along the way. Since the molten metal has farther to travel to reach the overflow (Zone V), the most heat is dropped off by the overflow metal and the least heat is dropped off by the biscuit metal.

The percentage of overflow heat loss % $Q_{LOSS}$ corresponds to the heat "dropped off" at each heat flow zone, and can be fairly accurately determined based upon a sum of digits calculation. The percentage of overflow heat loss is calculated using equation $$\% Q_{LOSS} = \frac{S}{S_T} \quad (13)$$

where the sum of digits S for the heat flow zone designed by number N is calculated using equation $$S = \sum_{x=0}^{N} (N - x) \quad (14)$$

and where the total sum of digits $S_T$ for the heat flow zone furthest from the point of injection designed by number $N_{MAX}$ is calculated using equation $$S_T = \sum_{x=0}^{N_{MAX}} (N_{MAX} - x) \quad (15)$$

Using Equations (13), (14) and (15) above, it can be determined that the percentage of overflow heat loss % $Q_{LOSS}$ for the biscuit (Zone 0) is 0%, for the main runner (Zone I) is 6.7%, for the gate runner (Zone II) is 20%, for the gate side of the casting (Zone III) is 40%, for the overflow side of the casting (Zone IV) is 67%, and for the overflow (Zone V) is 100%.

Then, the heat lost in transit $Q_{LT}$ of each heat flow zone is calculated using equation $$Q_{LT} = \% Q_{LOSS} \times Q_{LOSS} \times Q_Z \quad (16)$$

Next, the heat lost in transit per zone $Q_{LZ}$ is determined for each heat flow zone. For a selected heat flow zone, the heat lost in transit per zone can be estimated using equation $$Q_{LZ} = \frac{Q_{LT}}{N_T} \quad (17)$$

where $N_T$ is the number of heat flow zones the molten material for the selected heat flow zone must travel to reach the selected heat flow zone, i.e. the number of heat flow zones the molten material will drop off heat to. For example, $N_T=5$ for the overflow (Zone V), since the molten material for the overflow zone must travel through Zones 0-IV to reach Zone V. Therefore, Zones 0-IV each receive one-fifth of the heat lost in transit of Zone V.

Next, the heat added in transit $Q_{AT}$ for each flow zone is determined. The heat added in transit $Q_{AT}$ corresponds to the total amount of heat "dropped off" to a heat flow zone by the molten material passing through the heat flow zone. The heat added in transit for a selected heat flow zone can be estimated by summing the heat lost in transit per zone $Q_{LZ}$ of all of the heat flow zones past the selected heat flow zone. For example, the biscuit (Zone 0) has heat added to it from the molten metal passing through Zone 0 to Zones I-V. Therefore, the heat added in transit for the biscuit is estimated by summing the heat lost in transit per zone $Q_{LZ}$ for the main runner (Zone I), the gate runner (Zone II), the gate side of the casting (Zone III), the overflow side of the casting (Zone IV), and the overflow (Zone V). No heat is added to the overflow (Zone V), so the heat added in transit is zero.

Finally, the total heat $Q_{TZ}$ processed by each heat flow zone is calculated using equation $$Q_{TZ} = Q_Z + Q_{AT} - Q_{LT} \quad (18)$$

The total heat $Q_{TZ}$ processed by each heat flow zone can be expressed in terms of volume using the equation $$Q_{TZV} = \frac{Q_{TZ}}{V} \quad (19)$$

where $Q_{TZV}$ is the total heat processed by heat flow zone per volume of the heat flow zone.

In step 29, the number of cooling lines and their general placement within the heat flow zones of the die is determined. This determination is made by the user and is dependent on the geometry of the part cavity and the die, as well as the user's own experience and training. The redistribution of heat during cavity fill with respect to each heat flow zone or the total heat processed by each heat flow zone calculated in step 28 can also be taken into account. In this step, each cooling line can be assigned an individual designation, such as a number, and each cooling line can be assigned to one or more heat flow zones.

In step 30, the volume $V_C$ of the shot that each cooling line cools per heat flow zone is assigned. Similar to the selection in step 18 of the volume V of the shot that each heat flow zone cools, each cooling line is responsible to cool a portion of the shot for at least one heat flow zone, so it is necessary to determine how much of the shot in terms of volume each cooling line will cool so that the die can be designed properly. The determination of the volume is a design function that the user can select, usually based on the heat flow zone in which a particular cooling line resides. Each cooling line will extend through at least one heat flow zone. Some cooling lines will extend through more than one heat flow zone. In this case, the volume $V_C$ needs to be determined for each heat flow zone that the cooling line passes through. The volume should be assigned such that that sum of the volumes $V_C$ for each cooling line of a selected heat flow zone is about equal to the volume V for the selected heat flow zone.

Alternately, step 30 can comprise assigning a percentage of the total volume of the shot that each cooling line cools per heat flow zone to each cooling line. By assigning percentages, the location of the Neutral Thermal Axis of the casting can be defined by the user.

In step 32, the amount of heat that must be removed per shot $Q_{CL}$ by each cooling line is determined based on the volume $V_C$ of the shot that each cooling line cools that was selected in step 30. The amount of heat that must be removed per shot is the heat load a cooling line must carry, and is based upon the redistribution of heat to each zone, i.e. the total heat processed by heat flow zone per volume of the heat flow zone $Q_{TZV}$, and can be calculated using equation $$Q_{CL} = Q_{TZV} \times V_C \qquad (20)$$

with the understanding that if a cooling line extend through more than one heat flow zone, then the right side of Equation (20) must be determined for each heat flow zone the cooling line passes through, and then the values must be summed to determine $Q_{CL}$.

In step 33, the total heat load is determined by summing the values for the amount of heat that must be removed per shot $Q_{CL}$ for each cooling line. Then, the total heat load is compared to the total heat per shot $Q_{TS}$, which is determined in accordance with step 22. If they are not equal, then the cooling lines will either remove too much or too little heat during a casting cycle. In this case, the user must return to step 30 and reassign the volume $V_C$ of the shot that each cooling line cools per heat flow zone. Steps 30-33 may have to be cycled through several times until the heat load per cooling channel is properly balanced so that that the cooling lines are removing the proper amount of heat. It is also contemplated that the user might return to step 29 and change the number of cooling lines and their general placement within the heat flow zones. Once the volumes are properly distributed to the cooling lines, the values for the total heat load and the total heat per shot will be equal, which means that the cooling lines are removing the proper amount of heat per shot, and the user can move on to step 34.

In step 34, the heat flow area $A_{HF}$ is determined, which is the area of the casting surface in a vector extending from the casting surface to the cooling line, along the direction of the flow of heat. For any thermal gradient, heat will flow from the area of high temperature to the area of the low temperature. Therefore, in a die casting operation, heat will flow from the casting surface, which is at a higher temperature, to the cooling line, which is at a lower temperature. Heat flow area can be advantageously calculated from a three-dimensional model of the die, such as a CAD model.

The amount of heat that must be removed per shot $Q_{CL}$ for each cooling line that is calculated in step 32 is essentially a theoretical value, and does not take into account the amount of heat that is removed by the die spray. In step 36, the amount of heat that will be removed by the die spray $Q_{DS}$ is factored in to determine the amount of heat removed per shot $Q_{ACL}$ for each cooling line after die spray, and is calculated using the equations $$Q_{DS} = Q_S \times A_{HF} \qquad (21)$$

$$Q_{ACL} = Q_{CL} - Q_{DS} \qquad (22)$$

where the spray heat removal rate $Q_S$ was entered in step 14, the heat flow area $A_{HF}$ for each cooling line was calculated in step 34 and the amount of heat that must be removed per shot $Q_{CL}$ for each cooling line was calculated in step 32.

In step 38, the actual amount of heat removed per hour $Q_H$ by each cooling line is calculated. This step is needed because data related to cooling line flow rate and surface temperature is often expressed in an hourly format. The equation used is:

$$Q_H = \frac{Q_{ACL}}{T_C} \qquad (23)$$

In step 40, the heat flux q is determined, which is the heat content of each cooling line per unit of area through which heat must flow. The heat flux is related to the actual amount of heat removed by each cooling line per hour $Q_H$ and the heat flow area $A_{HF}$ calculated in step 34, and can be calculated using the equation $$q = \frac{Q_H}{A_{HF}} \qquad (24)$$

In step 42, the die material cooling constant k is entered. The die material cooling constant is related to and indicates the ability of the die material to absorb heat. Alternately, the die material cooling constant can be entered along with the spray data in step 14.

In step 44, the user can optionally set boundary conditions for the depth of each cooling line relative to the die surface, the surface temperature of each cooling line, the length of each cooling line, and the appropriate coolant flow rate of each cooling line. By setting boundary conditions, the user ensures that the die design meets safety standards and can operate under any constraints imposed by the casting facility, including those involving the coolant source or plant-wide water system. Such boundary conditions can include: a minimum distance from the cooling line to the surface of the casting; a minimum distance from the cooling line to the surface of the die; a minimum cooling line surface temperature; a maximum cooling line surface temperature; a minimum coolant flow rate; a maximum coolant flow rate; a minimum cooling line length; and, a maximum cooling line length. The boundary conditions can be determined by the user's discretion and experience, the geometry of the casting and the die, the capabilities of the coolant source, or any combination thereof.

In step 46, at least one of a target cooling line depth $D_{CCL}$ or a target cooling line surface temperature $T_{CL}$ is entered by the user for each cooling line. Only one of the target values is need to proceed to step 48, but the user can set both if desired. By setting the cooling line depth, a heat gradient is created that is fitted to the casting geometry and die thickness limitations. However, the cooling line surface temperature should fall within a reasonable range. Setting the cooling line surface temperature is desirable when the geometry and cavity depth are not significant limitations and can be helpful in finding an acceptable cooling line depth when there is a heat gradient problem.

In step 48, one of the target values from step 46 is selected, and the other of the cooling line depth $D_{CCL}$ or a cooling line surface temperature $T_{CL}$ is calculated. If the cooling line depth from step 52 is selected, then the cooling line surface temperature is calculated using the equations $$T_{AVE} = \frac{(T_I - T_{DIE})}{\ln\left(\frac{T_I}{T_{DIE}}\right)} \quad (26)$$

$$T_{CL} = T_{AVE} - \frac{(D_{CCL} \times q)}{k} \quad (27)$$

where the average die temperature $T_{AVE}$ is based on the injection temperature $T_I$ of the casting material selected in step 20 and the target die surface temperature at injection $T_{DIE}$ entered in step 24, the die material cooling constant k is entered in step 42, and the heat flux q is determined in step 40.

If the target cooling line surface temperature $T_{CL}$ from 52 is selected, then the cooling line depth is calculated, which is the placement of each cooling line determined in terms of distance or depth from the die surface. The depth of each cooling line can be expressed by the cooling line center depth $D_{CCL}$, which can be calculated using the equation $$D_{CCL} = \frac{k \times (T_{AVE} - T_{CL})}{q} \quad (28)$$

Optionally or alternately, the cooling line depth can be expressed in terms of, the surface depth $D_{SCL}$, which may be desirable for evaluating the safety of the die design since the user may want to ensure that the cooling line lies a sufficient minimum distance from the die surface. The cooling line surface depth can be calculated based on the cooling line center depth $D_{CCL}$ and the outer diameter of the cooling line $W_{CL}$ using the equation $$D_{SCL} = D_{CCL} - \left(\frac{W_{CL}}{2}\right) \quad (29)$$

The cooling line surface depth $D_{SCL}$ may be calculated using several different outer diameters $W_{CL}$, each outer diameter corresponding to a potential cooling line size, one of which the user can ultimately select as the outer diameter for the cooling line.

In step 52, a target cooling line length $L_{CL}$ or a target coolant flow rate F is entered for each cooling line. The cooling line length is limited by the geometry of the die, but the user usually has more than one optional length or a range of optional lengths to choose from. In one contemplated embodiment, the coolant flow rate entered can be standardized to a certain size and type of coolant line. For example, since many die casting companies use ¼ national pipe thread (NPT) line, the coolant flow rate can be entered in units of gallons per minute through a ¼ NPT line. Even if the diameter of the cooling line is different, the cooling flow rate can be automatically calculated from the standardized coolant flow rate. Only one of the target values is need to proceed to step 54, but the user can set both if desired. By setting the cooling line length or the coolant flow rate, the calculation of each cooling line depth is simplified, as discussed below.

In step 54, one of the target values from step 52 is selected, and other of the cooling line length $L_{CL}$ or coolant flow rate F is calculated using a two-step process. If the target cooling line length is selected, then the heat removal rate Q is first calculated and then used to determine the coolant flow rate F. The heat removal rate Q is calculated using the equation $$Q = \frac{Q_H}{L_{CL}} \quad (25)$$

where the actual amount of heat removed per hour $Q_H$ by each cooling line is determined in step 38 and the cooling line length $L_{CL}$ is the target cooling line length from step 52.

Then, using the heat removal rate Q and the cooling line surface temperature $T_{CL}$ from step 48, the required coolant flow rate F to achieve these conditions is determined. The cooling line surface temperature is based on the type of cooling line used (i.e. the size or diameter of the cooling line) and heat removal rate Q, and these values can be used to determine the coolant flow rate. The coolant flow rate can be determined using regression analysis applied to a set of actual test data to determine one or more regression equations that best fit the test data. The actual test data may be the measured heat removal rate of a cooling line at varying coolant flow rates, where the diameter of the cooling line and the cooling line surface temperature are known values or constants. Regression analysis of such test data results in a series of fourth order regression equations. For a given cooling line surface temperature, the regression equations can generally be expressed as:

$$y = a + bx + cx^2 + dx^3 \quad (30)$$

where the variable y is the heat removal rate, the variable x is the coolant flow rate and the "constants" a, b, c, and d are the regression parameters estimated by the regression analysis.

The regression equations can be used to estimate the coolant flow rate F for a cooling line having a given heat removal rate Q, a given cooling line surface temperature $T_{CL}$, and a given cooling line type (i.e. a given size or diameter). However, because the regression equations are limited by the cooling line surface temperatures from the test data, interpolation may be used to estimate the coolant flow rate F for a cooling line having the heat removal rate Q between values for two of the regression equations.

If the target coolant flow rate F is selected, it is used to determine the heat removal rate Q using the regression analysis technique described above. The heat removal rate Q is then used to determine the cooling line length $L_{CL}$ using Equation (25).

The values for the cooling line surface temperature, the cooling line surface depth, the coolant flow rate and the cooling line length are dependent on the type of cooling line. Thus, the calculations of steps 48 and 54 can optionally be determined for a number of potential types of cooling lines. For example, the cooling line type can be a bubbler or non-bubbler cooling line, or can be defined by its diameter, such as ¼, ⅛, or ⅜ inches. More specifically, the calculations of steps 48 and 54 may be done individually for a group of cooling line types comprising a ¼ NPT cooling line, a ¼ bubbler cooling line, a ⅛ NPT cooling line, a ⅛ bubbler cooling line, and a ⅜ NPT cooling line.

In step 56, the design of the die must be evaluated with respect to each cooling line of the die. Thus, the cooling line surface temperature and the cooling line surface depth determined in steps 46 and 48, and the coolant flow rate and the cooling line length determined in steps 52 and 54 are evaluated. These values can be evaluated in accordance with the boundary conditions set by the user in step 44. Because the boundary conditions are set by the user, the determination of whether the cooling line surface temperature, the cooling line surface depth, the coolant flow rate and the cooling line length are acceptable may lie ultimately with the user and is based on the user's experience and training. Alternately, a range of acceptable values can be predetermined based on performance and safety concerns.

With reference to the cooling line surface temperature, if the value is too high (i.e. too hot), the coolant at the surface may boil, which changes the coolant flow rate too rapidly to adequately control the die casting operation. If the value is too low (i.e. too cold), the heat removal rate for each cooling line is less controllable since the difference in temperature between the cooling line surface and the coolant becomes negligible. An exemplary range of acceptable values for the cooling line surface temperature is 100-425° F.

With reference to the cooling line surface depth, both safety and design are taken into consideration. Due to safety concerns, the surface of the cooling line must be spaced from the die surface a minimum safe distance. However, the design of the die places limitations on the maximum distance of the cooling line surface.

With reference to the coolant flow rate, the coolant supply, such as a plant-wide water system, may place constraints on what flow rates are achievable. The maximum possible coolant flow rate can be dictated by the pressure of the coolant supply, while the minimum flow rate can be dictated by the controllability of the coolant supply.

With reference to the cooling line length, die cast insert size and geometry dictate the minimum and maximum cooling line lengths.

If the values do not meet the set boundary conditions, an alert can be provided to the user, and the user can be prompted to return to either step 46 or step 52 to allow the user to choose a different target values, and the steps leading up to and including step 56 are performed again. The design method 10 allows that user to perform Steps 46-56 any number of times until an acceptable coolant flow rate, cooling line length, cooling line surface temperature $T_{CL}$ and cooling line surface depth $D_{SCL}$ for each cooling line is determined.

It is understood that since the values for the cooling line surface temperature, the cooling line surface depth, the coolant flow rate and the cooling line length are dependent on the type of cooling line, more than one set of these values may be acceptable. In step 58, the cooling line type is selected. The cooling line type may be selected from a list of possible cooling line kinds and sizes having acceptable values for the cooling line surface temperature, the cooling line surface depth, the coolant flow rate and the cooling line length. The list of possible cooling line types may be those most commonly used in the die casting industry. For example, the user may be able to select from a bubbler or non-bubbler cooling line, or from cooling lines of differing diameters, such as ¼, ⅛, or ⅜ inches. More specifically, the user may be able to selected from a group of cooling line types comprising a ¼ NPT cooling line, a ¼ bubbler cooling line, a ⅛ NPT cooling line, a ⅛ bubbler cooling line, and a ⅜ NPT cooling line. The list of possible cooling line types may optionally be reduced to those meeting the boundary conditions prior to the user making the selection. Further, an alert or other indication advising the user against selecting any cooling line types which do not meet the boundary conditions can be provided.

In step 59, normal heat losses due to convection and conduction are determined. The convection losses are caused by the movement of air around the die, which results in the transfer of heat between the air and the die. The conduction losses are caused by the direct contact between the die and the machine platens, which results in the transfer of heat between the die and the machine platens. This requires several new pieces of information related to the die and the cooling lines to be entered, which includes: the ambient air temperature $T_{AIR}$; the machine platen surface temperature $T_{MP}$; the die thickness $K_D$; the die contact area CA; the convective die surface area SA; the convective cooling rate $H_{CONV}$; and the conductive boundary cooling rate $H_{COND}$. The ambient air temperature $T_{AIR}$ is the mean or average temperature of the air that is in contact with the die during a casting cycle. The ambient air temperature will change due to environmental conditions. A typical value for the ambient air temperature is 100° F., but may range from 50° F. to 150° F. depending upon the season, time of day, and geographic location. The machine platen surface temperature $T_{MP}$ is the mean or average temperature of the die casting machine platens during a die casting operation. The die thickness $K_D$ is the thickness of one half of the die from the parting line to the corresponding machine platen, i.e. the thickness of the cover half from the parting line to the fixed platen or the thickness of the ejector half from the parting line to the moving platen. The die contact area CA is the area of contact between the die and the machine platens. The die contact area is dependent on the heat flow zone in which a selected cooling zone resides. The convective die surface area SA is an estimate of the surface area of a projected plane within the die casting tool that is near the average die surface temperature. The convective die surface area is slightly larger than the cast part contact area due to thermal gradients surrounding the part cavity, i.e. due to the fact that heat flows in multiple directions through the part cavity. The value of the convective die surface area is estimated by the user based on the user's training and experience, and can be refined over time. The convective cooling rate $H_{CONV}$ is the amount of heat removed from the die via its outer surface due to convection in terms of unit area and unit time. The convective cooling rate varies according to the humidity and air flow rate. Exemplary expected values for the convective cooling rate are between 0.1 and 0.12, however the exact range of the convective cooling rate is unknown at this point, since research on the convective cooling rate is limited. Thus, the convection cooling rate can be estimated by the user based on the user's training and experience and can be refined over time. The convective cooling rate be given in units of BTUs per square inch per hour. The conductive boundary cooling rate $H_{COND}$ is the percentage of expected heat flow over the boundary between the die and the machine platens. Theoretically, the conductive boundary cooling rate is 1, because the die and the machine platens are in perfect contact and therefore 100% of the expected heat will flow over the boundary between the die and the machine platens. Realistically however, surface imperfections in the die and machine platens leads to imperfect contact between the two, and the conductive boundary cooling rate will be less than 1. The range of possible values for the conductive boundary cooling rate is typically between 0.25 and 0.75. The value of the conductive boundary cooling rate depends upon the surface finish of the contacting faces of the die and the machine platen, and the contact force between the die and the machine platen. Most often, it is not desirable for the conductive boundary cooling rate to be high because it increases the uncontrolled heat loss to the die casting machine and causes the die casting machine temperature to rise.

From this information, the expected convective cooling $Q_{CONV}$ and conductive cooling $Q_{COND}$ per shot can be determined. The expected convective cooling is the amount of heat transferred from the die to the air around the die, and the expected conductive cooling is the amount of heat transferred from the die to the machine platens. These values can be calculated using equations $$Q_{CONV} = (T_{AVE} - T_{AIR}) \cdot SA \cdot H_{CONV} \cdot \left(\frac{T_c}{3600}\right) \quad (31)$$

$$Q_{COND} = k \cdot (T_{CL} - T_{MP}) \cdot \left(\frac{H_{COND} \cdot CA}{K_D - D_{CCL}}\right) \cdot \left(\frac{T_c}{3600}\right) \quad (32)$$

where the cycle time $T_C$ was determined in step 22, the die material cooling constant k was determined in step 42, the cooling line surface temperature $T_{CL}$, the average die surface temperature $T_{AVE}$, and the cooling line center depth $D_{CCL}$ were determined in steps 52 and 54.

Then, the percentage of normal losses % NL for each cooling line, which is the percent of heat lost due to convection and conduction versus the total heat processed for each cooling line, is determined based on the expected convective and conductive cooling and can be calculated using equations $$NL = Q_{CONV} + Q_{COND} \quad (33)$$

$$\% NL = NL + Q_{ACL} \quad (34)$$

where the total normal losses NL for each cooling line is the total amount of die heat lost due to convection and conduction, and the amount of heat removed per shot $Q_{ACL}$ was determined in step 34.

Finally, the actual amount of heat removed per shot $Q_A$ is determined. While the amount of heat removed by the die spray in taken into account when determining the amount of heat that must be removed per shot $Q_{ACL}$ in step 36, the amount of heat that is normally lost due to convection and conduction is not factored in, and will affect this value. The actual amount of heat removed per shot $Q_A$ can be calculated using the equation $$Q_A = Q_{ACL}(1 - \% NL) \quad (35)$$

In step 60, a summary of all cooling line selections and requirements is generated, and this summary is provided to a tool designer in step 62. In step 64, the die is designed per the summary of the cooling line selections and requirements. This includes configuring all cooling lines within the mold in correspondence with its selected cooling line type, cooling line depth, cooling line surface temperature, cooling flow rate, and cooling line length. In step 66, the die is built according to the design from step 64.

II. Thermal Design Software

FIGS. 3-12 illustrate an exemplary software program that can be used to carry out the design method 10 shown in the flowchart of FIGS. 2A and 2B. The software program enables the user to determine the length, cross-sectional size, and depth relative to the die surface of each cooling line in the die, and then determine the desired heat removal rate for each cooling line. Each Figure illustrates a dialog box or window that can be displayed on a computer screen and which enables the data entry and/or calculations of the design method 10 to be carried out and/or displayed.

FIG. 3 illustrates a window 68, titled Alloy Information, in which the entry of alloy data and spray data according to steps 12 and 14 of the design method 10 may be carried out. Alloy data can be entered in section 70, which comprises multiple data entry fields in which data can be entered. Section 70 can comprise at least six data entry fields: Alloy Name 72, Allow Density 74, Liquidus Temperature 76, Cooling Range 78, Specific Heat 80, and Latent Heat 82. Multiple columns of data entry fields can be provided so that information related to more that one alloy can be entered. In the illustrated window 68, five columns are provided so allow data for up to five alloys may be entered. Spray data can be entered in section 84, which comprises two data entry fields: Spray Heat Removal Rate 86 and Die Material Cooling Constant 88.

The window 68 can also include reference information provided for the user's benefit. Section 90 of the window 68 lists the units in which the data must be entered into their respective data entry field. For example, Alloy Density should be entered in lbs/in³. It is understood from the forgoing discussion of the design method 10 that the software can be configured to accept data in different units than the ones shown herein. Section 92 of the window 68 lists alloy data for common alloys used for die casting operations, and the cooling constant (K value) for common die materials. As illustrated, section 92 comprises three reference charts; Die Cast Alloy Thermal Data 94, Magnesium Table 96, and K Value Table 98. The inclusion of the reference information in sections 90 and 92 is optional, but allows the user to quickly ascertain the units and values for the data required in sections 70 and 92.

The window 68 further has a Save button 100 and an Exit button 102. When the Save button 100 is selected, the information entered into the window 68 will be saved in a data storage medium. When the Exit button 102 is selected, the window 68 will close. All of the forgoing windows in FIGS. 4-10 have a Save button 100 and an Exit button 102 that function in a similar fashion.

Figure 4:
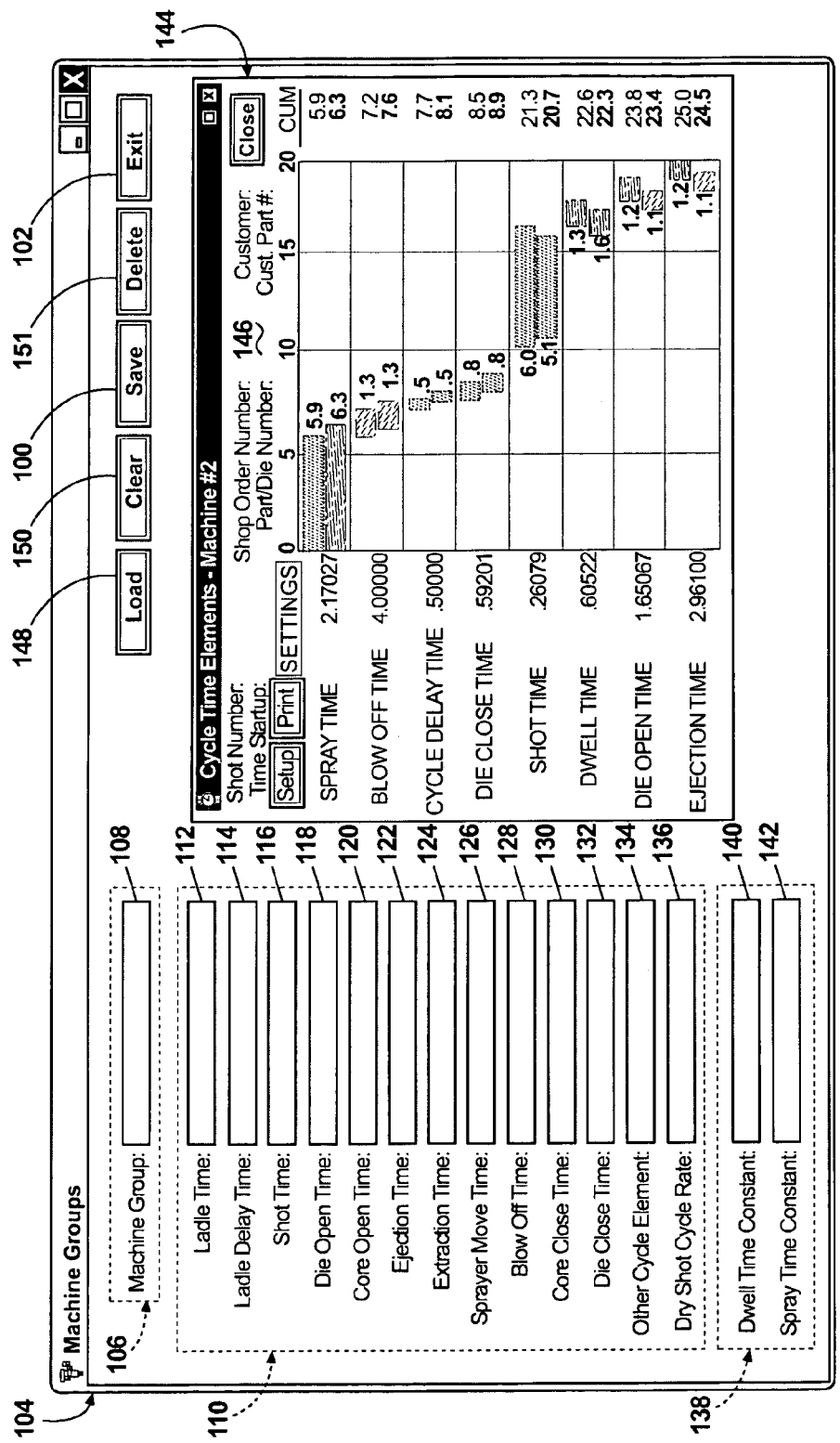

FIG. 4 illustrates a window 104, titled Machine Groups, in which the entry of machine cycle data according to step 16 of the design method 10 may be carried out. Section 106 of the window 104 comprises one data entry field, Machine Group 108, in which the name of the machine group being used can be entered.

Section 110 of the window 104 comprises multiple data entry fields in which the minimum amount of time required to complete a step or element of the die casting operation is entered. As illustrated, the data entry fields are: Ladle Time 112, Ladle Delay Time 114, Shot Time 116, Die Open Time 118, Core Open Time 120, Ejection Time 122, Extraction Time 124, Sprayer Move Time 126, Blow Off Time 128, Core Close Time 130, Die Close Time 132, and Other Cycle Element 134. The valve of time require to complete each element can be entered in seconds. If any of the elements listed as data fields in Section 110 are not part of the die casting operation, a value of zero may be entered. If an element is included in the die casting operation that not specifically listed in Section 110, the time require to complete this element can be entered in the Other Cycle Element data entry field 134. Section 110 further includes a calculation field, Dry Shot Cycle Rate 136, for displaying the dry shot cycle rate (DSCR), which is the sum of data entry fields 112-136, calculated using Equation (1).

Section 138 of the window 104 comprises two data entry fields: Dwell Time Constant 140 and Spray Time Constant 142. These constants are estimates and are based on the thickness of the casting.

Section 144 of the window 104 is provided for the user's benefit and can comprise a Gantt chart 146 showing the schedule of a die casting operation, with the start and stop times of each element of the die casting operation. The Gantt chart 146 can simply be a graphic of a typical die casting operation, or could be a real time rendering of the die casting schedule according to the information entered in Section 110.

The window 104 further has a Load button 148, a Clear button 150 and a Delete button 151 in addition to the Save button 100 and the Exit button 102. When the Clear button 150 is selected, the information in Sections 106, 110 and 138 is cleared or removed. When the Load button 148 is selected, machine cycle data that has been previously saved will automatically load, and the values for the machine cycle data will be displayed in the fields of Sections 106, 110 and 138. When the Delete button 151 is selected, all data entered into the software program will be deleted. All of the forgoing windows in FIGS. 5-10 have a Load button 148, a Clear button 150 and a Delete button 151 that function in a similar fashion.

FIGS. 5-12 illustrate a window 152, titled Calculate Water Lines, which has a plurality of cards 154. Each card comprises a tab 156 which can be selected to bring the associated card 154 to the forefront of the window 152. The titles of the cards 154 are shown on the tabs 156. Alternatively, instead of using one window 152 and a plurality of cards 154, the information displayed on each card 154 could be displayed in individual windows.

Each card is associated with one or more steps of the design method 10. As illustrated, the cards are: Basic Part Information 154A; Total Heat, Cycle Rate, Cooling Flow Rate 154B; Heat Redistribution During Cavity Fill 154C; Assign Volumes and Heat Flow Areas 154D; Heat Removal Summary 154E; Calculate Individual Cooling Channels 154F; Add Normal Losses 154G; and, Cooling Channel Calculations Summary 154H.

Figure 5:
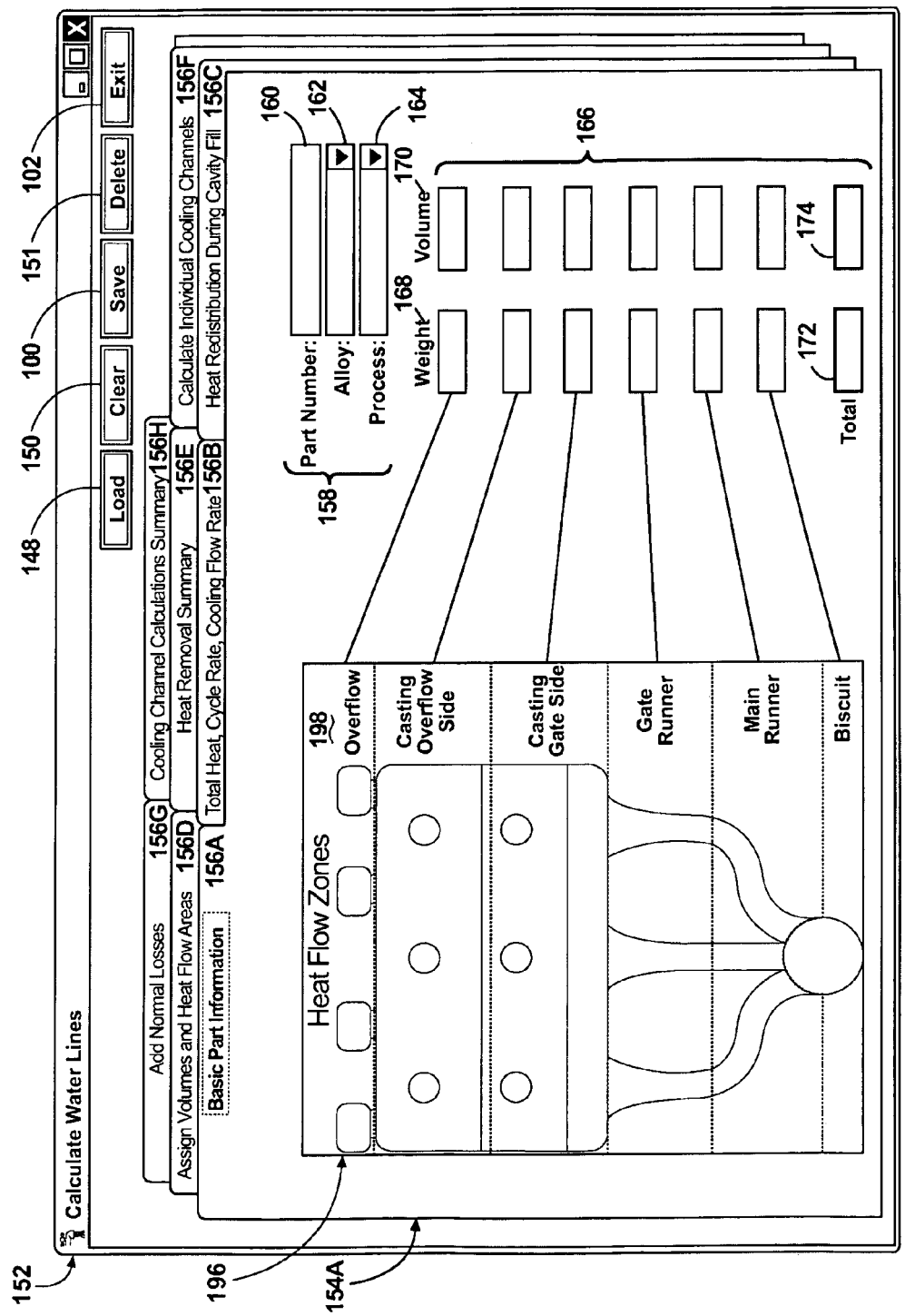

FIG. 5 illustrates the window 152 with the tab 156A selected so that the Basic Part Information card 154A is brought to the forefront. The entry of the weight or volume of each flow zone of the casting according to step 18 of the design method 10 can be carried out within the Basic Part Information card 154A. Section 158 of the Basic Part Information card 154A comprises a data entry field, Part Number 160, for entering a part number or name for the casting to be made by the die casting machine. Two list boxes 162, 164 are also provided in section 158, each having an arrow tab which, when selected, will display a list of options to choose from. The first list box, Alloy 162, is provided to allow the user to select the name of the alloy being used to make the casting. The options displayed when the arrow tab is selected can be compiled from the data entered in section 70 of window 68. The other list box, Process 164, is provided to allow the user to choose either a cold chamber or a hot chamber die casting process.

The weight or the volume of each heat flow zone can be entered in section 166, which comprises multiple data entry fields arranged in two columns 168, 170, titled Weight and Volume, respectively. Each column includes six data entry fields which correspond to the six heat flow zones. It is understood from the discussion of step 18 that only one of the weight or volume of each heat zone need be entered; the other value can be calculated using Equation (2). From the values entered in the columns 168, 170, the total shot weight and total shot volume can be determined using Equations (3) and Section 166 provides two calculation fields, one corresponding to the total shot weight 172 and the other corresponding to the total shot volume 174, for respectively displaying the calculated values.

Section 196 of the card 154A is provided for the user's benefit and can comprise a reference chart 198 showing the six heat flow zones of the die casting machine discussed above with reference to FIG. 1B. The card 154A further includes lines running from the data entry fields in columns 168 an 170 to the heat flow zones shown on the reference chart 198 to indicate which data entry field corresponds to a particular heat flow zone.

Figure 6:
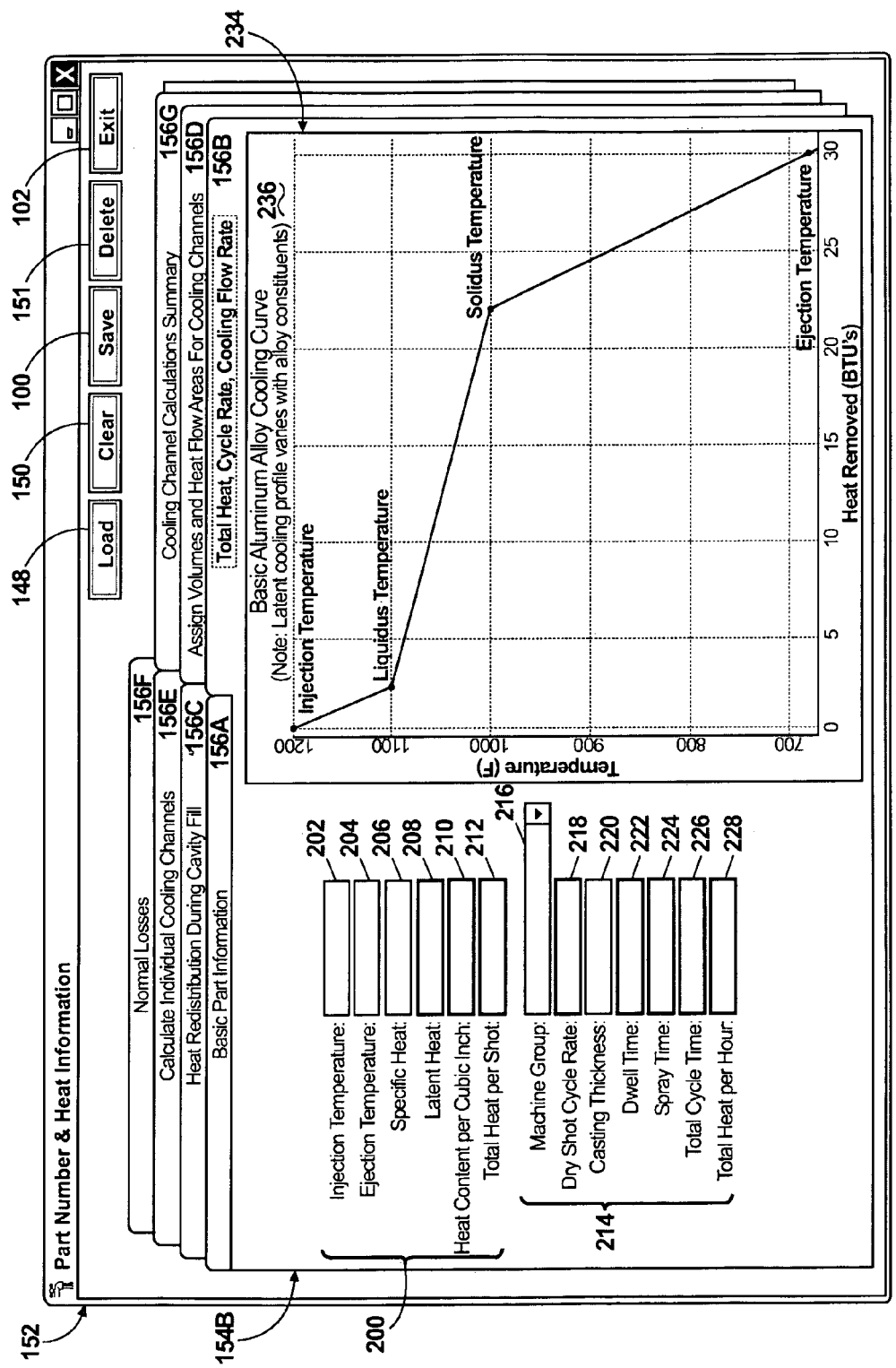

FIG. 6 illustrates the window 152 with the tab 156B selected so that the Total Heat, Cycle Rate, Cooling Flow Rate card 154B is brought to the forefront. The heat content calculation and the cycle time calculation according to steps 20 and 22 of the design method 10 can be carried out within the card 154B. The heat content calculation is carried out in Section 200, which comprises two data entry fields, Injection Temperature 202 and Ejection temperature 204, in which the injection temperature and the ejection temperature can be entered, respectively. The specific heat and the latent heat entered in section 70 of window 68 for the alloy chosen in section 158 of card 154A are also displayed in fields 206, 208, respectively, of section 200 because the values are used for the heat content calculation.

Section 200 further includes two calculation fields, Heat Content per Cubic Inch 210 and Total Heat per Shot 212, for respectively displaying the heat content $\Delta H$ of the casting material, which is calculated using Equation (5), and for displaying the total heat per shot $Q_{TS}$, which is calculated using Equation (9).

The cycle time calculation is carried out in section 214. Section 214 includes a list box, Machine Group 216, provided to allow the user to select the machine group being used in the die casting process. The options displayed when the arrow tab is selected can be compiled from the data entered and saved in window 104. Once a machine group is chosen, the dry shot cycle rate DSCR for that machine group is displayed in Dry Shot Cycle Rate field 218 and will match the value shown in calculation field 136 of window 104.

Section 214 further includes several calculation fields for displaying values calculated according to step 22 of the design method 10, as well as values used in the calculations. The Casting Thickness field 200 displays the thickness $K_C$ of the casting. The Dwell Time field 222 displays the dwell time $T_D$ calculated using Equation (6). The Spray Time field 224 displays the spray time $T_S$ calculated using Equation (7). The Total Cycle Time field 226 displays the cycle time $T_C$ calculated using Equation (8). The Total Heat per Hour field 228 displays the total amount of heat processed by the die per hour $Q_T$ calculated using Equation (10).

Section 234 of the card 154B is provided for the user's benefit and comprises a reference chart 236 showing the basic cooling curve for the alloy chosen in list box 162 on card 154A. The basic cooling curve can be used to determine suitable values for the injection and ejection temperatures. The basic cooling curve for an aluminum alloy is shown for illustrative purposes only.

Figure 7:
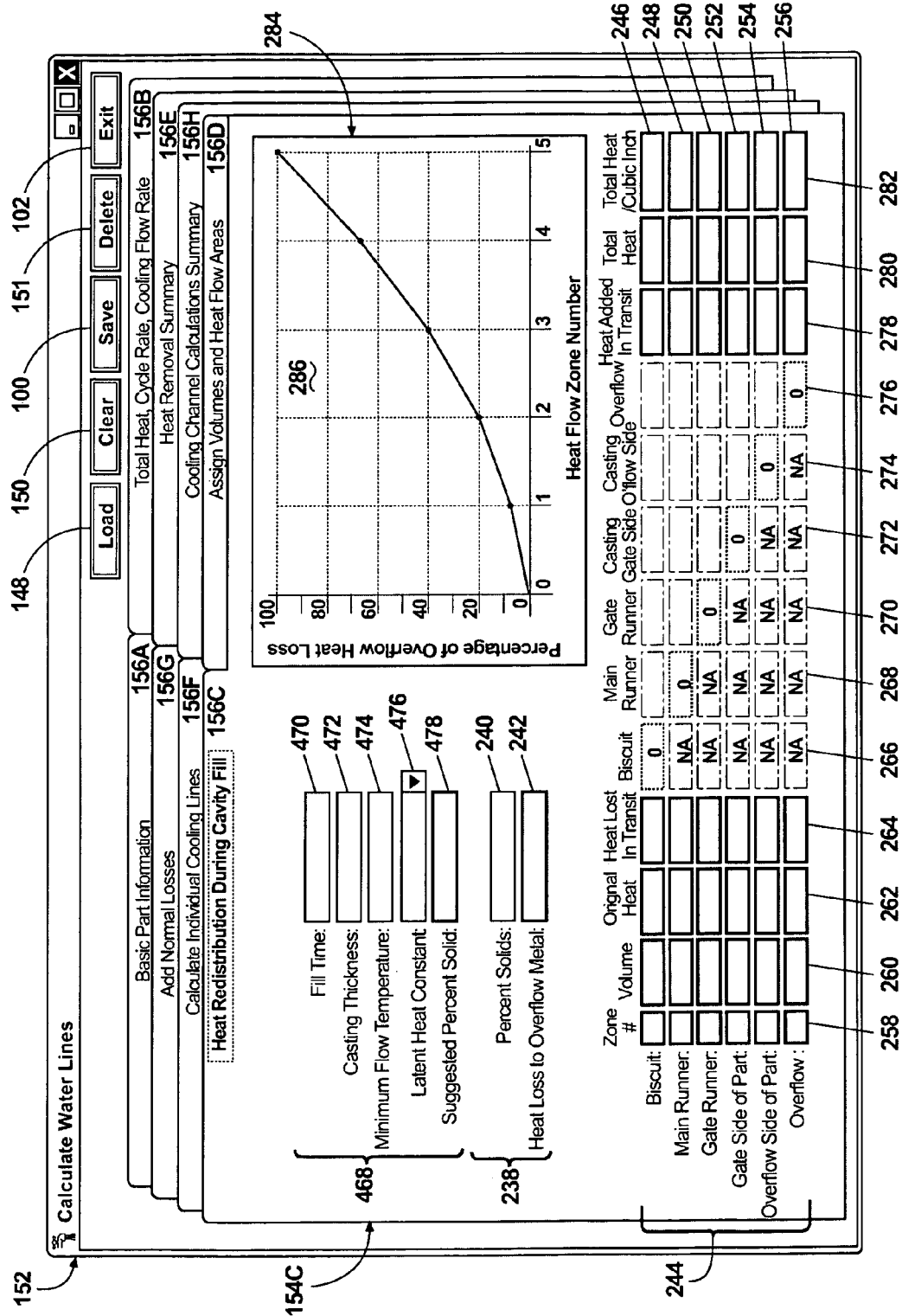

FIG. 7 illustrates the window 152 with the tab 156C selected so that the Heat Redistribution During Cavity Fill card 154C is brought to the forefront. The entry of the percentage of solids present during cavity fill and the calculation of the redistribution of heat during cavity fill according to steps 26 and 28 of the design method 10 can be carried out within the card 154C.

Section 468 of the card 154C comprises several data fields; Fill Time 470, in which the fill time $T_f$ can be entered; Casting Thickness 472, which displays the casting thickness entered in section 214 of card 154B (FIG. 6); Minimum Flow Temperature 474, in which the minimum flow temperature $T_{MIN}$ can be entered; and Suggested Percent Solids 478, in which the percentage of solids % S present during cavity fill can be calculated using Equation (37). A list box 476, titled Latent Heat Constant, is also provided in section 468 and has an arrow tab which, when selected, will display a list of optional alloy materials to choose from.

Section 238 of the card 154C comprises a data entry field, Percent Solids 240, in which the percentage of solids % S can be selected in accordance with step 26 of the design method 10. The value entered can be the Suggested Percent Solid from box 478, or a value that the user considered to be more accurate. Section 238 also includes a calculation field, Heat Loss to Overflow Metal 242, in which the heat loss to overflow metal $Q_{LOSS}$ calculated using Equation (11) can be displayed.

Section 244 of the card 154C comprises several rows and columns of fields, where each row corresponds to one of the heat flow zones of the casting and each column corresponds to a different piece of data for the heat flow zones. The rows are: Biscuit 246; Main Runner 248; Gate Runner 250; Gate Side of Part 252; Overflow Side of Part 254; and, Overflow 256. The columns are: Zone #258; Volume 260; Original Heat 262; Heat Lost in Transit 264; Biscuit 266; Main Runner 268; Gate Runner 270; Casting Gate Side 272; Casting O'flow Side 274; Overflow 276; Heat Added in Transit 278; Total Heat 280; and, Total Heat/Cubic Inch 282. Each row and column intersect at a field in which the value of the piece of data according to the column heading for the heat flow zone according to the row heading is displayed.

Section 244 shows many of the values used to determine the redistribution during cavity fill with respect to each heat flow zone in accordance with step 28 of the design method 10. The assigned zone number for each heat flow zone is shown in the fields of column 258. The assigned zone number corresponds to the variable N in Equation (14). For the heat flow zones discussed herein, the biscuit will be assigned zone number "0", the main runner will be assigned zone number "1", the gate runner will be assigned zone number "2", the gate side of the part will be assigned zone number "3", the overflow side of the part will be assigned zone number "4", and the overflow will be assigned zone number "5". The volume V of the shot that each heat flow zone cools is brought from card 154A and is displayed in the fields of column 260. The fields of column 262 show the original heat $Q_Z$ for each heat flow zone, which can be calculated using Equation (12). The fields of column 264 show the heat lost in transit $Q_{LT}$ of each heat flow zone, which can be calculated using Equation (16).

The heat lost in transit per zone $Q_{LZ}$, which can be calculated using Equation (17) is shown in the fields of columns 266-276. For fields where like heat flow zones intersect, for example where the Biscuit row 246 intersects with the Biscuit column 266, the value shown will be "0", since a heat flow zone will not lose heat to itself. For fields where the heat flow zone designated by one of the columns 266-276 intersects with a heat flow zone designed by one of the rows 246-256 that that former does not travel through, the value shown will be "NA", since the casting material attributed to a given heat flow zone will not give up heat to a heat flow zone that it does not travel through. For example, since the casting material attributed to the Biscuit (Zone 0) does not travel through any of the other heat flow zones, the value shown in the fields of column 266, rows 248-256 will be "NA".

The fields of column 278 show the heat added in transit $Q_{AT}$ for each flow zone, which can be calculated for a selected heat flow zone by summing the values in the fields of columns 266-276 for the selected heat flow zone. The fields of column 280 show the total heat $Q_{TZ}$ processed by each heat flow zone, which can be calculated using Equation (18). The fields of column 282 show the total heat processed by heat flow zone per volume of the heat flow zone $Q_{TZV}$, which can be calculated using Equation (19).

Section 284 of the card 154C is provided for the user's benefit and comprises a reference chart 286 in which the percentage of overflow heat loss % $Q_{LOSS}$ for each of the six heat flow zones is graphed. The percentage of overflow heat loss can be calculated using Equations (13), (14), and (15), and is also determined in accordance with step 28 of the design method.

Figure 8:
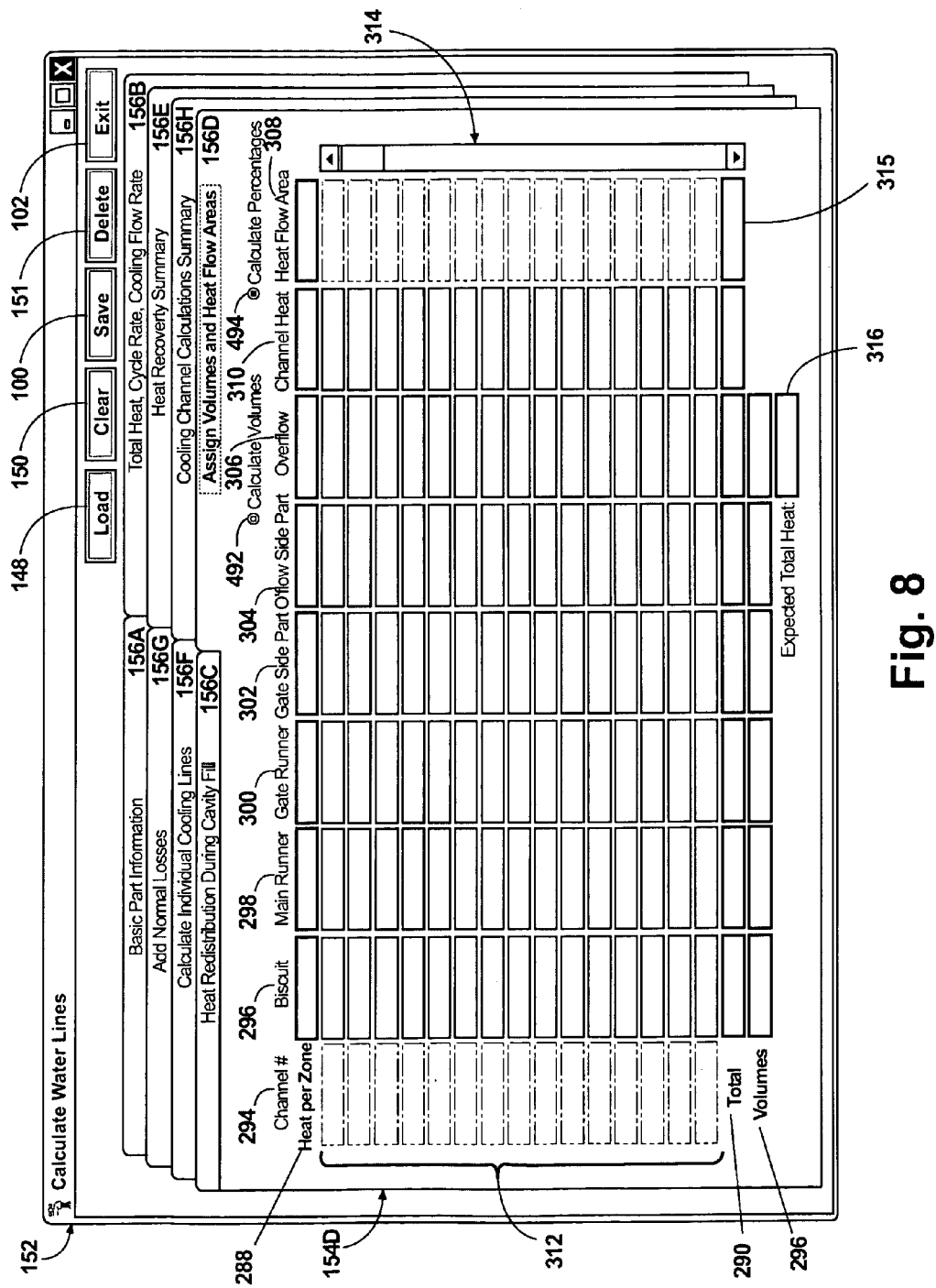

FIG. 8 illustrates the window 152 with the tab 156D selected so that the Assign Volumes and Heat Flow Areas card 154D is brought to the forefront. The calculation of the casting volume or percentage cooled per channel, the calculation of the heat load per channel, and the calculation of the heat flow area $A_{HF}$ according to steps 30, 32 and 34, respectively of the design method 10 can be carried out within the card 154D.

The card 154D comprises several rows and columns of fields. The rows include: Heat per Zone 288; Total 290; and Volumes 292. The columns are: Channel #294; Biscuit 296; Main Runner 298; Gate Runner 300; Gate Side Part 302; O'flow Side Part 304; Overflow 306; Heat Flow Area 308; and Channel Heat 310.

The rows 288 and 292 intersect with columns 296-306. The fields of row 288 display the total heat processed by heat flow zone per volume $Q_{TZV}$ for the heat flow zone according to the column heading, which can be calculated according to Equation (19) or automatically brought over from card 154C. The fields of row 292 display the volume V of the shot cooled by the heat flow zone according to the column heading, which can be entered by the user or automatically brought over from card 154A or 154C.

The card further comprise a group of cooling line rows 312, where each row within the group 312 corresponds to one of the cooling lines (also referred to herein as channels or cooling channels) of the die. The number of rows within the group 312 may vary in accordance with the number of cooling lines in the die. Accordingly, a scroll bar 314 is provided to the right of the group 312 so that the user may adjust the information that is in view. Each row of the group 312 intersects with columns 294-310 at a field in which the value of the piece of data according to the column for the cooling line according to the row is displayed. The individual designation assigned to each cooling line in step 29 can be shown in the fields of column 294.

The card 154D further includes two radio buttons 492, 494 which allow the values shown on the card 154D to be displayed according to the volume of shot or the percentage of the total volume of the shot that the each cooling line is responsible to cool. By selecting radio button 492, titled Calculate Volumes, the data to be entered on the card 154D can be entered in terms of the volume of the shot that each cooling line cools per heat flow zone. By selecting radio button 494, titled Calculate Percentages, the data to be entered on the card 154D can be entered in terms of the percentage of the total volume of the shot that each cooling line cools per heat flow zone. The selection of either radio button 492, 494 does not affect the calculation of the heat load per channel and the heat flow area according to steps 32 and 34 of the design method 10. However, by selecting radio button 494 to display percentages, the location of the Neutral Thermal Axis of the casting can be defined by the user.

Depending on which radio button 492, 494 is selected, the fields of columns 296-306 intersecting with the group of cooling line rows 312 show the volume $V_C$ or percentage of the shot that each cooling line cools per heat flow zone determined in accordance with step 30 of the design method 10.

Each cooling line will extend through at least one heat flow zone, and will therefore have a volume value displayed in the field corresponding to the at least one heat flow zone the cooling line extends through. A selected cooling line may extend through more than one heat flow zone, and in this case a value will be displayed in each field corresponding to the heat flow zones the particular cooling line travels through. A field corresponding to a heat flow zone through which a selected cooling line does not travel will not display a value, and may be left blank or display some other indicator, such as "NA", that the selected cooling line does not travel through the heat flow zone. For example, if a selected cooling line extends only through the biscuit, then only the field intersecting at the Biscuit column 294 and the row corresponding to the selected cooling line will contain a value. If a selected cooling line extends through both the main runner and the gate runner, then the fields intersecting at the Main Runner and Gate Runner columns 298, 300 and the row corresponding to the selected cooling line will contain a value.

The fields of column 308 show the heat flow area $A_{HF}$ for each cooling line, which is determined in accordance with step 34 of the design method 10. The fields of column 310 show the amount of heat that must be removed per shot $Q_{CL}$ for each cooling line, which is determined in accordance with step 32 of the design method 10 and which can be calculated using Equation (20).

The row 290 intersects with columns 296-310, and displays the sum of the values in the fields above it for the group of cooling line rows 312. For example, field 315 of row 290, column 310 displays the sum of the amount of heat that must be removed per shot $Q_{CL}$ for each cooling line, which is essentially the total heat load or the total amount of heat that will be removed per shot.

Data field 316, labeled Expected Total Heat, displays the total heat per shot $Q_{TS}$, which is calculated using Equation (9), and which can be brought over from card 154B. The software compares the value in field 316 to the value in field 315. If the values are not equal, then the cooling lines will either remove too much or too little heat during a casting cycle. In this case, the user must reassign the volume $V_C$ or percentage of the shot that each cooling line cools per heat flow zone. Once the volumes/percentages are properly distributed to the cooling lines, the values in fields 315 and 316 will be equal, which means that the cooling lines are removing the proper amount of heat per shot, and the user can move on to card 154D.

Figure 9:
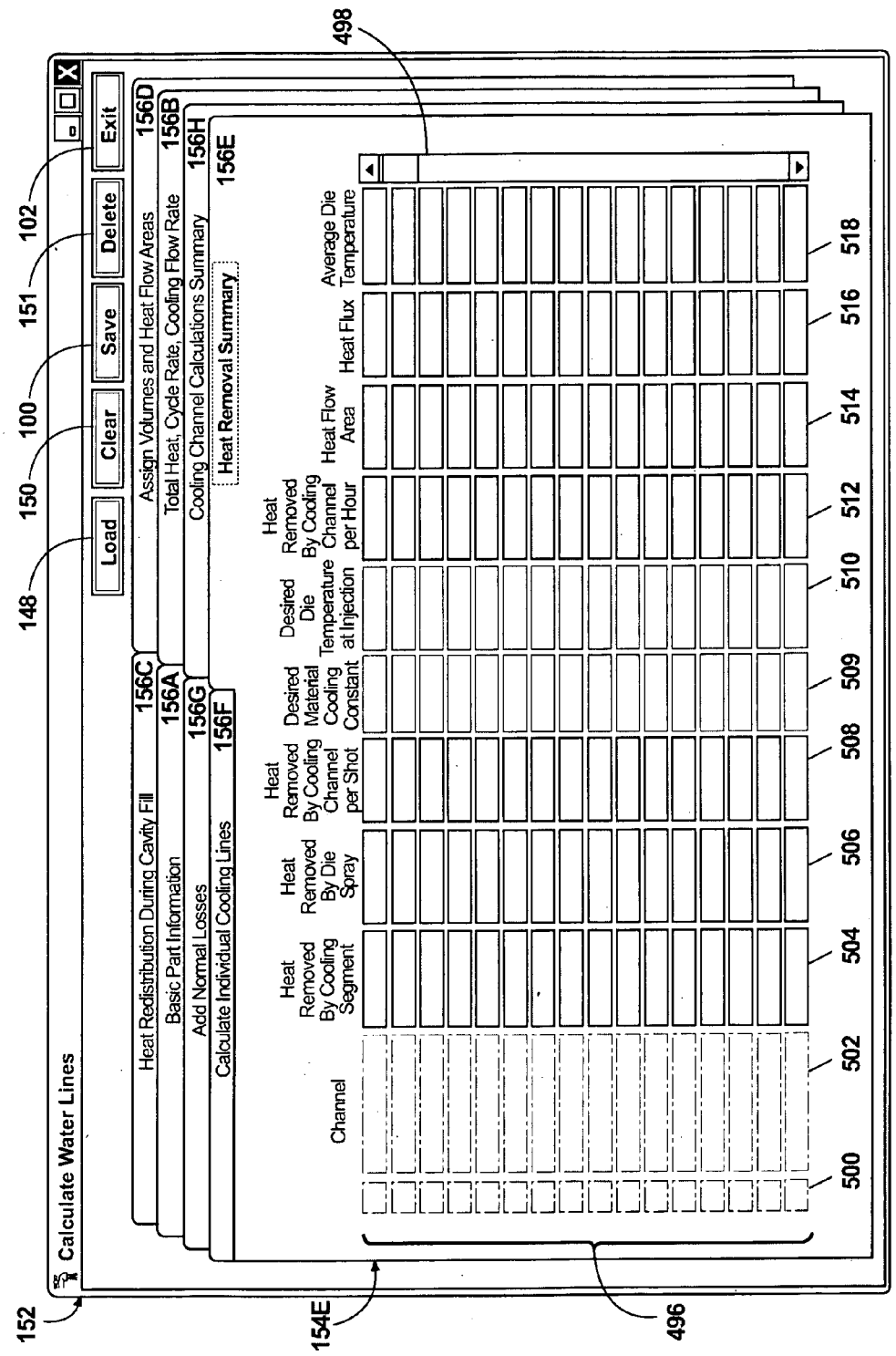

FIG. 9 illustrates the window 152 with the tab 156E selected so that the Heat Removal Summary card 154E is brought to the forefront. The calculation of the amount of heat removed by the die spray, the calculation of the cooling rate per hour of each cooling channel, the calculation of the heat flux, the entry of the die material cooling constant, the selection of the desired die temperature at injection, and the calculation of the average die surface temperature according to steps 24, 36-42 and 48 of the design method 10 can be carried out within the card 154E.

The card 154E comprises a group of cooling line rows 496, where each row within the group 496 corresponds to one of the cooling lines of the die, and several columns of fields. The number of rows in the group 496 may vary in accordance with the number of cooling lines in the die. Accordingly, a scroll bar 498 is provided to the right of the group 496 so that the user may adjust the information that is in view. The columns are: channel number 500; Channel 502; Heat Removed By Cooling Segment 504; Heat Removed by Die Spray 506; Heat Removed By Cooling Channel per Shot 508; Die Material Cooling Constant 509; Desired Die Temperature at Injection 510; Heat Removed by Cooling Channel per Hour 512; Heat Flow Area 514; Heat Flux 516; and Average Die Temperature 518. Each row corresponds to a cooling line of the die and each column corresponds to a different piece of data for the cooling lines.

Column 500 displays the channel number assigned to each cooling line. A brief verbal description of each cooling line can be entered into column 502; for example, the description can include information about the location of the cooling line with respect to the part cavity. The Heat Removed By Cooling Segment column 504 displays the amount of heat that must be removed per shot $Q_{CL}$ for each cooling line, which can be brought over from card 154D. The Heat Removed by Die Spray column 506 displays the amount of heat that will be removed by the die spray $Q_{DS}$ and the Heat Removed By Cooling Channel per Shot column 508 displays the actual amount of heat removed per shot $Q_{ACL}$, both of which are determined in accordance with step 36 of the design method 10. The values in column 506 can be calculated using to Equation (21) and the values in column 508 can be calculated using Equation (22). The die material cooling constant k can be entered into the Die Material Cooling Constant column 509 in accordance with step 42 of the design method 10. This value is dependent on the die material, and thus will not change for different cooling lines of the die. The Desired Die Temperature at Injection column 510 is a data entry column in which the desired or target die surface temperature at injection $T_{DIE}$ for the each cooling line can be entered in accordance with step 24 of the design method 10. The Heat Removed by Cooling Channel per Hour column 512 displays the actual amount of heat removed per hour $Q_H$ by the selected cooling line, which is determined in accordance with step 38 of the design method 10 and which can be calculated using Equation (23). The Heat Flow Area column 514 displays the heat flow area $A_{HF}$ for the selected cooling line, both of which can be automatically brought over from card 154D, shown in FIG. 15 where it was first determined in accordance with step 34 of the design method 10. The Heat Flux column 516 displays the heat flux q for the selected cooling line, which is determined in accordance with step 40 of the design method 10 and which can be calculated using Equation (24). The Average Die Temperature column 518 displays the average die temperature $T_{AVE}$ for the selected cooling line, which is determined in accordance with step 48 of the design method 10, and which can be calculated using Equation (26).

Figure 10:
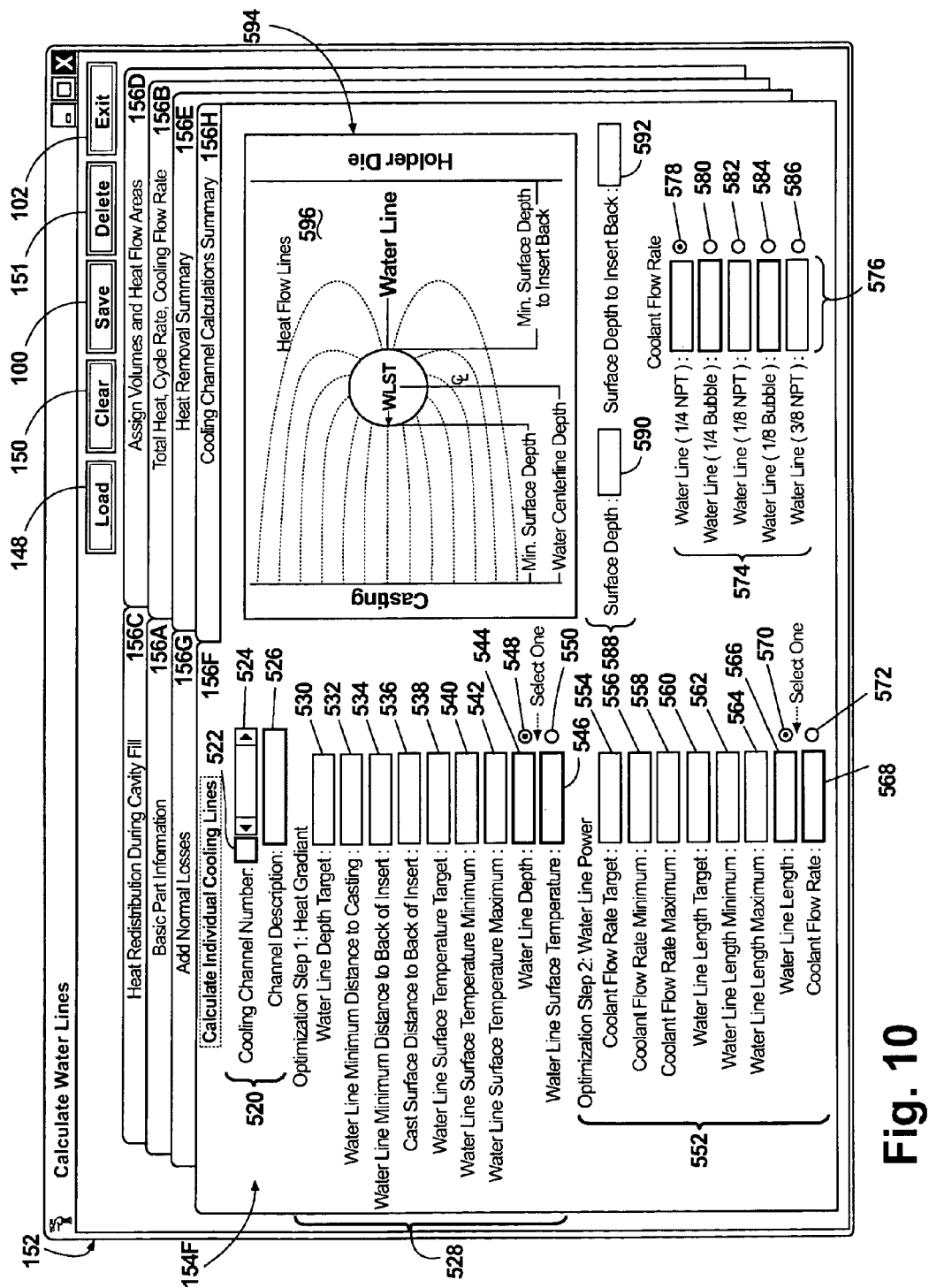

FIG. 10 illustrates the window 152 with the tab 156F selected so that the Calculate Individual Cooling Channels card 154F is brought to the forefront. The entry of boundary conditions and the target values for the cooling line surface temperature, the cooling line surface depth, the coolant flow rate and the cooling line length, the selection of the cooling line length, the calculation of the heat removal rate per cooling line length, the evaluation of the calculated values for each cooling line, and the selection of the cooling line type according to steps 44-58 of the design method 10 can be carried out within the card 154F.

Section 520 of the card 154F comprises a selection field 522, labeled Cooling Channel Number, in which one of the cooling lines of the die can be selected using the scroll arrows 524 provided next to the field 522, and a display field 526, titled Channel Description, which displays the verbal description of each cooling line entered into column 502 of card 154E.

Section 528 of the card 154F, titled Optimization Step 1: Heat Gradient, comprises several data entry fields and calculation fields in which information related to the optimization of the cooling line surface temperatures and cooling line depth in accordance with the established heat gradient in the die is shown. The fields include: Water Line Depth Target 530; Water Line Minimum Distance to Casting 532; Water Line Minimum Distance to Back of Insert 534; Cast Surface Distance to Back of Insert 536; Water Line Surface Temperature Target 538; Water Line Surface Temperature Minimum 540; Water Line Surface Temperature Maximum 542; Water Line Depth 544; and Water Line Surface Temperature 546.

The critical user entries of section 528 are the target values for the cooling line depth and the cooling line surface temperature, which are entered in fields 530 and 538 in accordance with step 46 of the design method 10, respectively, although the user can optionally enter only one of the two values. While two options are not required, it is to the user's advantage to be able to quickly switch between the two target values. The target values can be determined by the user based upon a desired die thickness and desired cooling line length to allow for conformal cooling of a thermal zone. The remaining entries are boundary conditions which are entered to define the design constraints for the die in accordance with step 44 of the design method 10. The user enters a minimum distance from the cooling line to the surface of the casting in field 532, a minimum distance from the cooling line to the surface of the die in field 534, the distance between the surface of the casting and the surface of the die in field 536, a minimum cooling line surface temperature in field 540, and a maximum cooling line surface temperature in field 542.

Section 528 is further provided with two radio buttons 548, 550 which allow the user to select either the target cooling line depth or the cooling line surface temperature entered in fields 530 and 538, respectively. The target values are used in the optimization routine when the corresponding radio button 548, 550 is selected. If radio button 548 is selected, the target cooling line depth entered in field 530 will be displayed in field 544 and the cooling line surface temperature will be calculated and displayed in field 546. If radio button 550 is selected, the target cooling line surface temperature entered in field 538 will be displayed in field 546 and the cooling line depth will be calculated and displayed in field 544. The calculations can be carried out using Equation (27) or (28), as appropriate, in accordance with step 48 of the design method 10.

Section 552 of the card 154F, titled Optimization Step 2: Water Line Power, comprises several data entry fields and calculation fields in which information related to the optimization of the cooling line performance is shown. The fields include: Coolant Flow Rate Target 554; Coolant Flow Rate Minimum 556; Coolant Flow Rate Maximum 558; Water Line Length Target 560; Water Line Length Minimum 562; Water Line Length Maximum 564; Water Line Length 566; and Coolant Flow Rate 568.

The critical user entries of section 552 are the target coolant flow rate and the target cooling line length, with are entered in fields 554 and 560 in accordance with step 52 of the design method 10, respectively, although the user can optionally enter only one of the two values. While two options are not required, it is to the user's advantage to be able to quickly switch between the two target values. The target values can be determined by the user based upon a desired cooling flow usage and a desired cooling line length based upon insert size. The remaining entries are boundary conditions which are entered to define the design constraints for the die. The user enters a minimum coolant flow rate in field 558, a maximum coolant flow rate in field 560, a minimum cooling line length in field 562, and a maximum cooling line length in field 564.

Section 552 is further provided with two radio buttons 570, 572 which allow the user to select either the target cooling line length or the coolant flow rate entered in fields 560 and 554, respectively. The target values are used in the optimization routine when the corresponding radio button 570, 572 is selected. If radio button 570 is selected, the target cooling line length entered in field 560 will be displayed in field 566 and the coolant flow rate will be calculated and displayed in field 568. The heat removal rate Q is first calculated the using Equation (25) and the cooling line length entered in field 560 in accordance with step 52 of the design method 10. Then, using the cooling line surface temperature from field 546 and the heat removal rate Q, regression analysis is performed to determine the coolant flow rate which will achieve the given conditions for a variety of cooling line types, shown in section 574. Section 574 includes a column 576 of several data fields labeled according to the potential cooling line types, which include Water Line (¼ NPT), Water Line (¼ Bubbler); Water Line (⅛ NPT), Water Line (⅛ Bubbler), and Water Line (⅜ NPT). These cooling line types are commonly used in the industry; however, it is understood that other cooling line types could be listed on card 154E. It is also contemplated that the potential cooling lines types listed in section 574 could be a user-entry.

If radio button 572 is selected, the target coolant flow rate entered in field 556 will be displayed in field 568 and the cooling line length will be calculated and displayed in field 566. The cooling line length is determined by first performing regression analysis using the coolant flow rate entered in field 556 and the cooling line surface temperature from field 546 to determine the heat removal rate Q for a variety of cooling line types, shown in section 574. Then, the cooling line length for each cooling line type is determined using Equation (25) and displayed in section 574.

Radio buttons 578-586 are provided next to the data fields to allow the user to select one of the potential cooling line types. Section 588 of the card 442F includes two calculation fields 590, 592, titled Surface Depth and Surface Depth to Insert Back, respectively, which are determined in accordance with the cooling line type selected in section 574. The Surface Depth field 590 displays the surface depth $D_{SCL}$ for the cooling line, which can be calculated using Equation (29) in accordance with step 48 of the design method 10. The Surface Depth to Insert Back field 592 displays the surface depth to insert back, which is the difference between the distance between the surface of the casting and the surface of the die entered in field 536 and the surface depth.

Section 594 of the card 154F is provided for the user's benefit and comprises a reference chart 596 schematically illustrating a cooling line positioned between a casting and a holder die, and showing the minimum surface depth, the water centerline depth, and the minimum surface depth to insert back.

At this point of using the software, the design of the die must be evaluated with respect to each cooling line of the die in accordance with step 56 of the design method 10, which includes evaluating the cooling line surface temperature displayed in field 546, the cooling line depth displayed in field 548, the cooling line length displayed in field 566 and the coolant flow rate displayed in field 568. In addition, the user may evaluate the cooling line type associated with a set of values to determine if the cooling line type is one that the user desires to employ in the die, in accordance with step 58 of the design method 10.

The evaluation can be accomplished in any suitable manner: the user may evaluate the values; the software may automatically evaluate these values; or, the evaluation may comprise a combination of user-initiated and automatic software evaluation steps.

In one embodiment, the evaluation can be accomplished using the boundary condition entered in sections 528 and 552. If any value is outside the boundary conditions, the fields 548, 546, 566 and 568 can display an alert or indicator of this fact, such as coloring the field red. Additionally, if any of the values for one of the cooling line types shown in section 574 exceed the boundary conditions, the corresponding field of column 576 can display an indicator of this fact. Furthermore, upon the selection of one of the cooling line types, if the values for the surface depth $D_{SCL}$ or the surface depth to insert back shown in section 588 exceed boundary conditions, the corresponding fields 590, 592 can display an alert or indicator of this fact.

Alternately, instead of the user entering boundary conditions, the software can be programmed with suitable ranges of values, or can be configured to calculate a suitable rage of values based on the information entered by the user up to this point.

When the values listed for the cooling line surface, the cooling line depth, the cooling line length and the coolant flow rate are acceptable and if they designate a cooling line type the user desires to employ in the die, the user may select the cooling line type to be used for the selected cooling line in accordance with step 58 of the design method 10 by clicking the radio button 578-586 corresponding to the desired cooling line type. Thus, since the cooling line type is individually set for each cooling line, the die may comprise more than one type of cooling line. Optionally, if any of the cooling line types do not meet the boundary condition, the user may be advised against or even prevented from selecting that cooling line type, such as by coloring the corresponding field in column 576 red or by prevents its associated radio button 578-586 from being selected.

Figure 11:
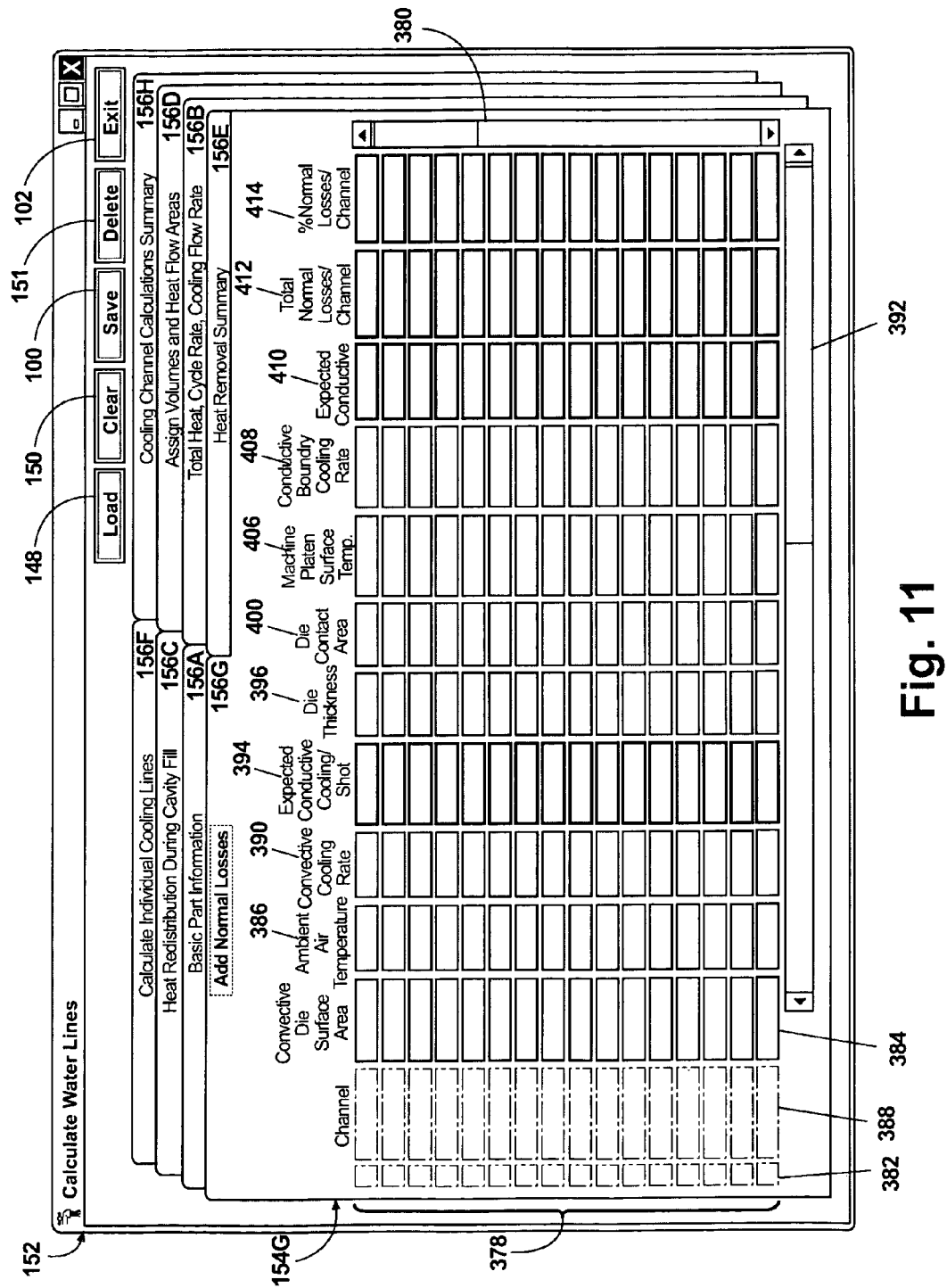

FIG. 11 illustrates the window 152 with the tab 156F selected so that the Add Normal Losses card 154G is brought to the forefront, in which the normal heat losses due to convention and conduction can be determined in accordance with step 59 of the design method 10. The card 154G comprises a group of cooling line rows 378, where each row within the group 378 corresponds to one of the cooling lines of the die, and several columns of fields. The number of rows in the group 378 may vary in accordance with the number of cooling lines in the die. Accordingly, a scroll bar 380 is provided to the right of the group 378 so that the user may adjust the information that is in view. A second scroll bar 392 may be provided beneath the group 378 to adjust which columns are in view.

The columns are: Channel #382; Channel 388; Convective Die Surface Area 384; Ambient Air Temp. 386; Convective Cooling Rate 390; Expected Convective Cooling per Shot 394; Die Thickness 396; Die Contact Area 400; Machine Platen Surface Temp. 406; Conductive Boundary Cooling Rate 408; Expected Conductive Cooling per Shot 410; Total Normal Losses per Channel 412; and, Percentage Normal Losses per Channel 414. Each row corresponds to a cooling line of the die and each column corresponds to a different piece of data for the cooling lines.

Column 382 displays the channel number assigned to each cooling line. Column 388 can display the verbal description of each cooling line from column 502 on card 154E (FIG. 9). The Convective Die Surface Area column 384 displays the convective die surface area SA, the Ambient Air Temp. column 386 displays the ambient air temperature $T_{AIR}$, the Convective Cooling Rate column 390 displays the convective cooling rate $H_{CONV}$, the Die Thickness column 396 displays the die thickness $K_D$, the Die Contact Area column 400 displays the die contact area CA, the Machine Platen Surface Temp. column 406 displays the machine platen surface temperature $T_{MP}$, and the Conductive Boundary Cooling Rate column 408 displays the conductive boundary cooling rate $H_{COND}$, all of which are entered by the user. The Expected Convective Cooling per Shot column 394 displays the expected convective cooling $Q_{CONV}$ per shot, which can be calculated using Equation (31). The Expected Conductive Cooling per Shot column 410 displays the expected conductive cooling $Q_{COND}$ per shot for each cooling line, which can be calculated using Equation (32). The Total Normal Losses per Channel column 412 displays the total normal losses NL for each cooling line, which can be calculated using Equation (33). The Percentage Normal Losses per Channel column 414 displays the percentage of normal losses % NL for each cooling line, which can be calculated using Equation (34).

Figure 12:
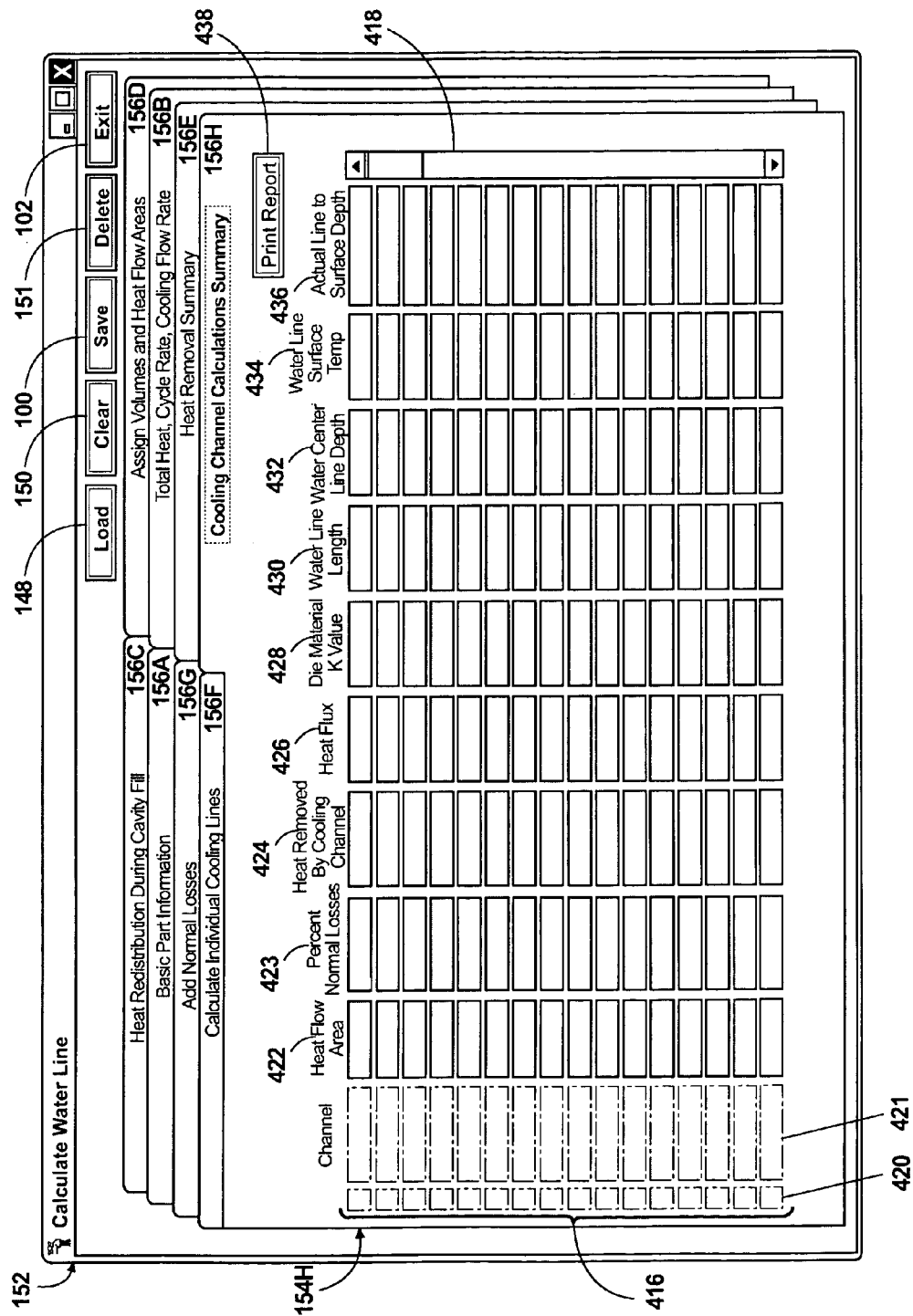

FIG. 12 illustrates the window 152 with the tab 156H selected so that the Cooling Channel Calculations Summary card 154H is brought to the forefront. The summary of the cooling line selection and requirements generated according to step 60 of the design method 10 can be displayed on the card 154H.

The card 154H comprises a group of cooling line rows 416, where each row within the group 416 corresponds to one cooling line of the die, and several columns of fields. The number of rows in the group 416 may vary in accordance with the number of cooling lines in the die. Accordingly, a scroll bar 418 is provided to the right of the group 416 so that the user may adjust the information that is in view.

The columns are: Channel #420; Channel 421; Heat Flow Area 422; Percentage Normal Losses per Channel 423; Heat Removed by Cooling Channel 424; Heat Flux 426; Die Material K Value 428; Water Line Length 430; Water Line Depth 432; Water Line Surface Temperature 434; and Actual Line to Surface Depth 436. Each row corresponds to one cooling line of the die and each column corresponds to a different piece of data for the cooling line.

The Heat Flow Area column 422 displays the heat flow area $A_{HF}$ for each cooling line, which can be automatically brought over from card 154D, where it was first determined in accordance with step 34 of the design method 10. The Percentage Normal Losses per Channel column 423 displays the percentage of normal losses % NL for each cooling line, which can be automatically brought over from card 154G where it was first determined in accordance with step 59 of the design method 10. The Heat Removed by Cooling Channel column 424 displays the actual amount of heat removed per shot $Q_A$ for each cooling line, which can be determined in accordance with step 59 of the design method 10 and calculated using Equation (35). The Heat Flux 426 the heat flux q for the each cooling line, which can be brought over from card 154E, where it was first determined in accordance with step 40 of the design method 10. The Die Material K Value column 428 displays the die material cooling constant k, which can be automatically brought over from card 154E, where it was first entered in accordance with step 42 of the design method 10. The Water Line Length column 430 displays cooling line length $L_{CL}$ for each cooling line, which can be automatically brought over from card 154F, where it was first determined in accordance with steps 52 and 54 of the design method 10. The Water Line Depth column 432 displays the cooling line center depth $D_{CCL}$ for the each cooling line, which can be automatically brought over from card 154F, where it was first calculated in accordance with steps 46 and 48 of the design method 10. The Water Line Surface Temperature column 434 displays the cooling line surface temperature $T_{CL}$ for each cooling line, which can be automatically brought over from card 154F, where is was first determined in accordance with steps 46 and 48 of the design method 10. The Actual Line to Surface Depth column 436 displays the surface depth $D_{SCL}$ for the each cooling line, which can be automatically brought over from card 154F, where it was first calculated in accordance with steps 46 and 48 of the design method 10.

The card 154F further comprises a Print Report button 438, which can be selected to print a report detailing the information displayed on the card 154F. This report can be provided to a tool design in accordance with step 62 of the design method 10. From the report, a die may be designed with all of the cooling line selections and requirements per step 64 and built according to the die design per step 66 of the design method 10.

III. Conclusion and Benefits

In conclusion, an improved method 10 for designing a mold for forming a part in a casting process is presented in which the mold has at least one cooling line. The method 10 comprises the steps of providing at least one of a cooling line depth and a cooling line surface temperature for the at least one cooling line (step 46), determining the other of the at least one of a cooling line depth and a cooling line surface temperature for the at least one cooling line (step 48), providing at least one of a cooling flow rate and a cooling line length for the at least one cooling line (step 52), determining the other of the at least one of a cooling flow rate and a cooling line length for the at least one cooling line for a selection of cooling line types (step 54), and selecting a cooling line type for the at least one cooling line from the selection of cooling line types (step 58).

Any of the steps of this method 10 can be repeated until a desired mold design is reached.

The method 10 can further comprise receiving at least one boundary condition and comparing at least one of the cooling line depth, cooling line surface temperature, cooling flow rate, and cooling line length to the boundary condition (steps 44 and 56). The method 10 can further comprise providing an alert if the at least one boundary condition is not satisfied by the at least one of the selected cooling line type, cooling line depth, cooling line surface temperature, cooling flow rate, and cooling line length (step 56). The method 10 can further comprise reducing the selection of cooling line types to those meeting the at least one boundary condition, whereby a user is advised against using those cooling line types which do not meet the at least one boundary condition (step 56).

The step of determining the other of the at least one of a cooling flow rate and a cooling line length for a selection of cooling line types can be performed by regression analysis from empirical data (step 54).

The step of providing at least one of a cooling line depth and a cooling line surface temperature further comprises locating the cooling line depth within a heat gradient across the metal forming tool in a desired location (step 52).

The method 10 can further comprise configuring a cooling line within the mold corresponding to the selected cooling line type, cooling line depth, cooling line surface temperature, cooling flow rate, and cooling line length (step 64).

The step of determining the other of the at least one of a cooling line depth and a cooling line surface temperature for the at least one cooling line further comprises calculating the heat removal rate of the at least one cooling line (step 54).

In another aspect, the method 10 can further comprise the steps of establishing at least one parameter of the casting process (steps 12, 14, 16, 18, 24, 26) and calculating a heat load to be carried by the at least one cooling line based on the at least one parameter (step 32).

The step of providing at least one of a cooling flow rate and a cooling line length (step 52) can further comprise the step of ensuring that a position of the cooling line is capable of carrying the heat load.

The calculating and determining steps (steps 32, 48, 54) can be carried out automatically by a software program.

The establishing step can comprise establishing at least one of alloy data (step 12), spray data (step 14), machine cycle data (step 16), shot data (step 18), desired temperature of the tool at injection (step 24) and percent solids during cavity fill (step 26). The step of establishing alloy data (step 12) can include establishing at least one of the name, density, liquidus temperature, cooling range, specific heat, and latent heat of a casting material. The step of establishing machine cycle data (step 16) can include establishing at least one of dry shot cycle rate, dwell time constant, and spray time constant. The step of establishing shot data (step 18) can include establishing the weight of the at least one heat flow zone, the volume of the at least one heat flow zone, the total weight of a shot, and total volume of a shot.

The mold can defines at least one heat flow zone and the calculating step further comprises calculating the distribution of heat among the at least one heat flow zone of the metal forming tool during cavity fill based on the at least one parameter (step 28). The calculating step further comprises determining the number of cooling lines in the at least one heat flow zone based on the distribution of heat among the at least one heat flow zone before calculating the heat load (step 29). The at least one heat flow zone can comprise an overflow and the calculating step includes determining the heat removed from the mold by transit of a casting material to the overflow before calculating the heat load (step 28). The calculating step further comprises determining (28) the heat added to the at least one heat flow zone by transit of a casting material through the least one heat flow zone (step 29), and determining the heat removed from the heat flow zone by transit of casting material through at least one other heat flow zone (step 28).

A die designed using the design method 10 according to the invention offers many benefits over other dies. In designing a die to have cooling lines placed in appropriate positions, one can assure that the die surface is maintained at a proper temperature. The software that implements the design method 10 according to one aspect of the invention is beneficial towards helping the user position cooling lines in appropriate places to optimize product quality, the production rate of a die casting operation, to minimize potential defects, and to create the best dimensional accuracy possible.

The design method 10 and the associated software provides a tool for optimizing die design by placing cooling lines with precision to maximize the thermal control of the cooling system. The optimization of the cooling line surface temperature, the cooling line surface depth, the coolant flow rate, the cooling line length and cooling line type for each cooling line is accomplished quickly and accurately.

Figure 13:
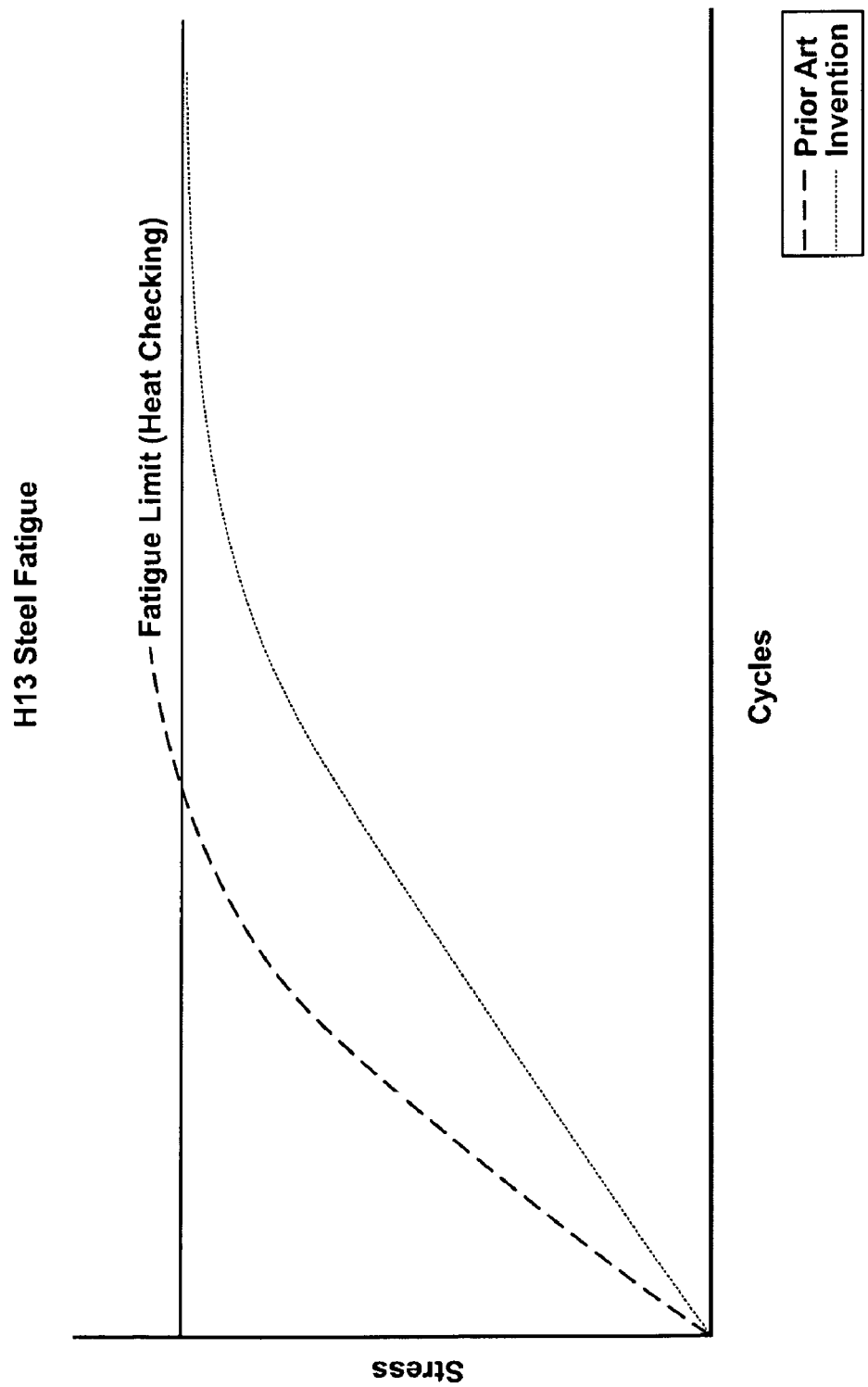
FIG. 13 is an exemplary graph comparing the steel fatigue of a prior art die to a die designed in accordance with the design method shown in the flowchart of FIGS. 2A and 2B.

With the ability to maintain the die surface temperature at a target or desired value, the highest temperature that the die surface of the die has to withstand can be minimized. Thus, the coolant temperature change for the die will be lower than for other dies because the die surface temperature is closely monitored. For example, the coolant temperate change for a typical die may be around 900-1000° F., while the coolant temperature change for a die designed according to the invention may be around 600° F. Since the coolant temperature change is minimized, thermal fatigue of the die is reduced since it will undergo less extreme thermal cycling. Referring to FIG. 13, an exemplary graph comparing the thermal fatigue experienced by a die according to the invention to a prior art die is shown. The dies are both made of H13 steel. Due to the coolant temperature change being more extreme for the prior art die, the prior art die reaches its fatigue limit in a fewer number of cycles than the die according to the invention. Exceeding the fatigue limit of the material the mold is made from can cause a phenomenon called "heat checking" to occur. Heat checking thermally insulates the die and reduces the potential heat removal from that die.

The ejection temperature of a casting can be more closely controlled, which offers advantages in the areas of shrinkage, dimensional accuracy, and cycle times. By designing the die properly, one can ensure that the casting is ejected as a consistently high temperature, and inconsistent shrinkage of the casting is avoided. The thermal design of the mold can force a volumetric void to form at a desired location within the casting, where it is not a product quality concern. Also, by ensuring that the casting is even cooled, the casting can be ejected sooner, rather than waiting for portions of the casting to cool a sufficient amount for ejection, while other portions of the casting cool too long. Thermal control and thermal balance of the casting also reduces the amount of injection force and the number of injector pins required to take a casting out of the die.

Dimensional accuracy is primarily affected by the design of the die. The dimensional accuracy of a casting is driven by the variation of temperatures within different portions of the casting at ejection. The larger the variation of ejection temperatures within a casting, the more unlikely it is that the casting in dimensionally accurate. The design method of the invention will ensure that the correct amount of heat will be removed from the casting prior to ejection so that the ejection temperature of the casting within a suitable range for dimensional accuracy. Consequently, the amount of post-casting machining required on the casting can be reduced as well.

In current design methods, the heat required to cool non-casting portions of the shot, like the biscuit and runners, is not taken into account. Cooling non-casting portions of the shot can end up dominating the casting cycle, meaning that cycle time is excessively long because of cooling the non-casting portions of the shot and not because of cooling the casting. Since the heat redistribution within the heat flow zones of the die is factored into the calculations of the design method 10, the cycle time can be optimized.

The software program described with respect to FIGS. 3-12 can be advantageously used to fully calculate the thermal design of a die according to the design method 10.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention, which is defined in the appended claims.

What is claimed is:

1. A method for making a mold for forming a part in a casting process, the mold having at least one cooling line, comprising the steps of:
   providing at least one of a cooling line depth and a cooling line surface temperature for the at least one cooling line;
   determining the other of the at least one of a cooling line depth and a cooling line surface temperature for the at least one cooling line;
   providing at least one of a cooling flow rate and a cooling line length for the at least one cooling line;
   determining the other of the at least one of a cooling flow rate and a cooling line length for the at least one cooling line for a selection of cooling line types;
   selecting a cooling line type for the at least one cooling line from the selection of cooling line types and incorporating the selected cooling line type into the mold.

2. The method according to claim 1 wherein any of the steps of this method can be repeated until a desired mold design is reached.

3. The method according to claim 1, and further comprising the step of receiving at least one boundary condition and comparing at least one of the cooling line depth, cooling line surface temperature, cooling flow rate, and cooling line length to the boundary condition.

4. The method according to claim 3, and further comprising the step of providing an alert if the at least one boundary condition is not satisfied by the at least one of the selected cooling line type, cooling line depth, cooling line surface temperature, cooling flow rate, and cooling line length.

5. The method according to claim 4, and further comprising reducing the selection of cooling line types to those meeting the at least one boundary condition, whereby a user is advised against using those cooling line types which do not meet the at least one boundary condition.

6. The method according to claim 1 wherein the step of determining the other of the at least one of a cooling flow rate and a cooling line length for a selection of cooling line types is performed by regression analysis from empirical data.

7. The method according to claim 1 wherein the step of providing at least one of a cooling line depth and a cooling line surface temperature further comprises locating the cooling line depth within a heat gradient across the metal forming tool in a desired location.

8. The method according to claim 1, and further comprising configuring a cooling line within the mold corresponding to the selected cooling line type, cooling line depth, cooling line surface temperature, cooling flow rate, and cooling line length.

9. The method of claim 1, wherein the step of determining the other of the at least one of a cooling flow rate and a cooling line length for the at least one cooling line further comprises calculating the heat removal rate of the at least one cooling line.

10. The method according to claim 1, and further comprising the steps of:
    establishing at least one parameter of the casting process; and
    calculating a heat load to be carried by the at least one cooling line based on the at least one parameter.

11. The method according to claim 10 wherein the step of providing at least one of a cooling flow rate and a cooling line length further comprises the step of ensuring that a position of the cooling line is capable of carrying the heat load.

12. The method of claim 10, wherein the calculating step and the determining steps are carried out automatically by a software program.

13. The method of claim 10, wherein the establishing step comprises establishing at least one of alloy data, spray data, machine cycle data, shot data, desired temperature of the tool at injection and percent solids during cavity fill.

14. The method of claim 13 wherein the step of establishing alloy data includes establishing at least one of the name, density, liquidus temperature, cooling range, specific heat, and latent heat of a casting material.

15. The method of claim 13, wherein the step of establishing machine cycle data includes establishing at least one of dry shot cycle rate, dwell time constant, and spray time constant.

16. The method of claim 13, wherein the step of establishing shot data includes establishing the weight of the at least one heat flow zone, the volume of the at least one heat flow zone, the total weight of a shot, and total volume of a shot.

17. The method of claim 10, wherein the mold defines at least one heat flow zone and the calculating step further comprises calculating the distribution of heat among the at least one heat flow zone of the metal forming tool during cavity fill based on the at least one parameter.

18. The method of claim 17, wherein the calculating step further comprises determining the number of cooling lines in the at least one heat flow zone based on the distribution of heat among the at least one heat flow zone before calculating the heat load.

19. The method of claim 17, wherein the at least one heat flow zone comprises an overflow and the calculating step includes determining the heat removed from the mold by transit of a casting material to the overflow before calculating the heat load.

20. The method of claim 17, wherein the calculating step further comprises determining the heat added to the at least one heat flow zone by transit of a casting material through the least one heat flow zone, and determining the heat removed from the heat flow zone by transit of casting material through at least one other heat flow zone.

21. The method of claim 1 further comprising the step of using the mold in the casting process.

* * * * *